United States Patent [19]
Goetz et al.

[11] Patent Number: 5,854,913
[45] Date of Patent: Dec. 29, 1998

[54] MICROPROCESSOR WITH AN ARCHITECTURE MODE CONTROL CAPABLE OF SUPPORTING EXTENSIONS OF TWO DISTINCT INSTRUCTION-SET ARCHITECTURES

[75] Inventors: John W. Goetz, Jericho; Stephen W. Mahin; John J. Bergkvist, both of Chittenden, all of Vt.

[73] Assignee: International Business Machines Corporation, Armonk, N.Y.

[21] Appl. No.: 872,370

[22] Filed: Jun. 10, 1997

Related U.S. Application Data

[63] Continuation of Ser. No. 480,105, Jun. 7, 1995, abandoned.

[51] Int. Cl.[6] .............................. G06F 9/22; G06F 9/455
[52] U.S. Cl. ........................................... 395/386; 395/417
[58] Field of Search .................................. 395/386, 417, 395/412, 416

[56] References Cited

U.S. PATENT DOCUMENTS

| | | | |
|---|---|---|---|
| 4,077,058 | 2/1978 | Appell et al. | 395/650 |
| 4,084,235 | 4/1978 | Hirtle et al. | 395/500 |
| 4,285,040 | 8/1981 | Carlson et al. . | |
| 4,456,954 | 6/1984 | Bullions, III et al. | 395/417 |
| 4,727,480 | 2/1988 | Albright et al. . | |
| 4,739,472 | 4/1988 | Hayashi . | |
| 4,774,652 | 9/1988 | Dhuey et al. . | |
| 4,782,443 | 11/1988 | Matsumoto . | |
| 4,799,187 | 1/1989 | Einarson et al. . | |
| 4,835,734 | 5/1989 | Kodaira et al. . | |
| 4,839,797 | 6/1989 | Katori et al. | 395/375 |
| 4,868,740 | 9/1989 | Kagimasa et al. . | |
| 4,992,934 | 2/1991 | Portanova et al. . | |
| 5,025,366 | 6/1991 | Baror . | |
| 5,091,846 | 2/1992 | Sachs et al. . | |
| 5,255,379 | 10/1993 | Melo . | |
| 5,307,504 | 4/1994 | Robinson et al. . | |
| 5,335,331 | 8/1994 | Murao et al. . | |
| 5,339,422 | 8/1994 | Brender et al. . | |
| 5,394,558 | 2/1995 | Arakawa et al. . | |
| 5,430,862 | 7/1995 | Smith et al. . | |
| 5,438,672 | 8/1995 | Dey . | |
| 5,481,684 | 1/1996 | Richter et al. | 395/375 |
| 5,546,552 | 8/1996 | Coon et al. | 395/375 |

FOREIGN PATENT DOCUMENTS

| | | |
|---|---|---|
| 0 169 565 | 7/1985 | European Pat. Off. . |
| 0 264 215 | 5/1987 | European Pat. Off. . |
| 0 272 198 | 12/1987 | European Pat. Off. . |
| WO 96/24895 | 8/1996 | WIPO . |

OTHER PUBLICATIONS

Mike Johnson [Superscalar Microprocessor Design] Prentice–Hall, pp. 65–67, 1991.
Andrew S. Tanenbaum [Structured Computer Organization] Prentice–Hall, pp. 10–12, 1984.
H.L. Kurtz. "Extending the Addressing Capabilities of the IBM Series/1 to 32 Bits" *IBM Technical Disclosure Bulletin* vol. 29, No. 4, Sep. 1986.
G.G. Gruse. "Sixteen to Thirty–Two Bit Operating System Capability Method for Personal Computers" *IBM Technical Disclosure Bulletin* vol. 34 No. 4B Sep. 1991.

*Primary Examiner*—Parshotam S. Lall
*Assistant Examiner*—Gautam R. Patel
*Attorney, Agent, or Firm*—Whitham, Curtis, & Whitham

[57] ABSTRACT

A microprocessor which supports two distinct instruction-set architectures. The microprocessor includes a mode control unit which enables extensions and/or limitations to each of the two architectures and controls the architectural context under which the microprocessor operates. The control unit controls memory management unit (MMU) hardware that is designed to allow address translation to take place under the control of a mode bit so that the translation mechanism can be switched from one architecture to another. A single MMU translates addresses of the two distinct architectures under control of the mode bit which is also used to simultaneously inform instruction decode which architecture is being used so that instructions are properly decoded. The MMU is also capable of mapping the address translation of one architecture onto that of the other so that software written for both architectures may be multi-tasked under the control of a single operating system.

28 Claims, 16 Drawing Sheets

1201 — Current Stack Segment Descriptor (DPL)

1202 — CR0 (WP)

1203 — Page Table Entry (U/S, R/W)

| 1204 | WP | CPL | U/S | R/W | Access |
|---|---|---|---|---|---|
| | 0 | User | 0 | 0 | Read-only |
| | 0 | User | 0 | 1 | R/W |
| | 0 | User | 1 | 0 | None |
| | 0 | User | 1 | 1 | None |
| | 0 | Super | 0 | 0 | R/W |
| | 0 | Super | 0 | 1 | R/W |
| | 0 | Super | 1 | 0 | Read-only |
| | 0 | Super | 1 | 1 | R/W |
| | 1 | User | 0 | 0 | Read-only |
| | 1 | User | 0 | 1 | R/W |
| | 1 | User | 1 | 0 | None |
| | 1 | User | 1 | 1 | None |
| | 1 | Super | 0 | 0 | Read-only |
| | 1 | Super | 0 | 1 | R/W |
| | 1 | Super | 1 | 0 | Read-only |
| | 1 | Super | 1 | 1 | R/W |

MICROPROCESSOR WITH AN ARCHITECTURE MODE CONTROL CAPABLE OF SUPPORTING EXTENSIONS OF TWO DISTINCT INSTRUCTION-SET ARCHITECTURES

This application is a continuation of application Ser. No. 08/480,105, filed Jun. 7, 1995, now abandoned.

BACKGROUND OF THE INVENTION

1. Field of the Invention

The present invention generally relates to microprocessors and, more particularly, to a microprocessor with an architecture mode control capable of supporting extensions to two distinct instruction-set architectures (hereinafter referred to simply as "architectures").

2. Background Description

There are currently two competing microprocessor architectures used in personal computers. One, referred to as the X86 architecture, was developed by Intel Corporation and supports a family of microprocessors, especially the 80386, 80486, Pentium®, and P6™ processors. The other, referred to as the PowerPC™ architecture, was jointly developed by International Business Machines Corporation and Motorola and currently includes a plurality of PowerPC processors. (PowerPC is a trademark of the IBM Corp.) The PowerPC processors are reduced instruction set computer (RISC) processors, while the X86 architecture is an example of a complex instruction set computer (CISC) architecture.

There is a need to be able to support a broad range of software including a very large installed base of software for the X86 architecture and newer software written to take advantages of the PowerPC processing power. A processor that implements the two architectures does so to allow execution of software from either architecture, thus expanding its potential marketplace. The usefulness and potential marketability of such a processor is greatly enhanced if it can allow either software standard to run dynamically in a multitasking environment. There are, however, several problems with allowing the two architectures to operate in this fashion. These include the different instruction sets and the different use of address space inherent to the two architectures. One approach is to perform a software emulation of the CISC architecture on the RISC processor; however, this approach sacrifices the processing speed of the RISC processor and does not support multitasking software written for the two different architectures. What is needed is a hardware solution that will realize the full potential of the RISC processor speed yet insure full compatibility between the two architectures.

A RISC processor, such as the PowerPC, has a very limited instruction set, whereas modern CISC processors have a very extensive instruction set, including both simple and complex instructions. Adding the instruction set of a CISC processor to a RISC processor would defeat the very purpose of the design of the RISC processor. Therefore, translating the CISC instruction set so that the RISC processor can execute the CISC instructions with its limited instruction set is a formidable problem. This problem is further exacerbated by the need to distinguish between instructions written for the two different instruction sets so that proper decoding can be accomplished. If multitasking for programs written for the two different architectures is to be accomplished, properly identifying and decoding instructions written for the two different instruction sets must be done dynamically and transparently to the user.

Supporting two architectures on a single processor and allowing dynamic multitasking between software implemented for either architecture also involves the control over the architectural context in which the processor's execution units operate. The X86 and PowerPC architectures, for example, differ greatly in the design not only of the instruction sets but also on the assumptions each instruction places on execution resources, like registers and result flags. These resources also consume considerable space in a processor. Operand size and type, allowable operations, and synchronization requirements of operations also differ between each architecture.

The PowerPC architecture defines a set of thirty-two general purpose registers (GPRs) used in fixed-point operations and a separate set of thirty-two floating-point registers (FPRs) used in floating-point operations. Any of the thirty-two registers may be used in the respective fixed or floating-point operations. Values held in the registers are always right-justified. Specific instructions are defined to load and store data between the registers and memory, and a separate set of instructions are defined to operate on data in the registers. No instructions are defined to, for example, load data from memory and add it to a value in a register. Two separate instructions would be required to perform the operation.

The X86 architecture defines a set of eight GPRs and eight FPRs. The FPRs are organized as a stack rather than a register file. Certain instructions place restrictions on how the registers in the GPRs may be used, making the GPRs less than general. For example, move string operations restrict the use of EDI and ESI as index registers. In four of the GPRs, values are not required to be right-justified; rather, they may be referenced directly from the second byte of the register. Many instructions may perform operations on memory locations. For example, the add instruction may take one source from a GPR, another from memory and write the result back into the source memory location.

PowerPC fixed and floating-point execution instructions often define three register operands: two source operands and a target. Similar X86 instructions define just two operands: a source operand and a source/target operand. One or both of the X86 operands may be memory locations and not just registers, unlike the operands included in instructions for PowerPC processors.

A number of other differences exist between the two architectures' execution resource assumptions that further distinguish them. For example, the PowerPC architecture defines eight result control fields within a single register, and compare and branch instructions may operate on any of the eight fields, allowing optimizing compilers great flexibility in code generation. The X86 architecture defines only one set of result controls for use by comparison and branch (jump) instructions.

A further problem directly related to the differing instruction set architectures is control over the architectural context in which instructions themselves are fetched from main memory and decoded by the processor's fetch and decode logic. In this case again, the X86 and PowerPC architectures differ greatly in the requirements they place on such logic.

The PowerPC architecture defines all instructions to be exactly four bytes long, with opcodes and operand information in fixed locations. Instructions are always aligned on a word (4-byte) boundary, and as a result never cross cache, page or segment boundaries.

The X86 architecture, on the other hand, defines variable-length instructions, with operand information in non-regular locations dependent on the instruction and any opcode prefixing. Instructions are aligned only at byte boundaries and therefore may cross cache, page and segment boundaries. As a result, the demands placed on the design of instruction fetch and decode logic for each architecture are vastly different, with X86 demands being much more difficult to implement efficiently than PowerPC demands.

Another problem is memory management since the underlying operating system is capable of managing only one of the two architectures' address translation mechanisms. There are two significant reasons for this. One is that the virtual memory management portion of the operating system (referred to as the VMM) is written for just one of the two architectures. The other is that existing processors contain only one memory management unit (MMU) in direct support of the processor's instruction set architecture. MMUs tend to consume significant physical space on a processor die, so physical space constraints impose an additional impediment to implementing a single processor which supports two architectures.

Both the PowerPC and X86 processor architectures define memory management schemes whereby a large virtual memory space may be mapped into a smaller physical address space. In both architectures, the translation from virtual to physical address is a two-step process. First, the effective address calculated as part of instruction execution undergoes segment translation to form a virtual address. The virtual address is then translated via the paging mechanism to form a physical address. While this is the basic process, the terminology sometimes varies. For example, the X86 literature sometimes refers to the effective address as the offset portion of a logical address (the selector forms the remaining portion of a logical address) and a virtual address as a linear address. Despite the similarities in the basic address translation process, the details of segment and page translation between the two architectures differ greatly.

In a 64-bit version of the PowerPC architecture, effective addresses (EAs) are translated to virtual addresses (VAs) via a hashed segment table search. The lower five bits of the effective segment identification (ESID) extracted from the EA are hashed and then concatenated with an address space register to form the real address of the segment table group in memory. The individual segment table group entries are searched until an entry is found whose effective segment ID matches that of the original EA. When found, the virtual segment ID (VSID) is extracted from the segment table group entry and concatenated with the page and byte fields of the original EA to form the VA.

In a 32-bit version of the PowerPC architecture, the upper four bits of the EA are used as an index into one of sixteen segment registers. The VSID is extracted from the segment register and concatenated with the page and byte fields of the original EA to form the VA.

In X86 architecture address translation, EAs are translated to VAs via a direct segment table lookup. A selector value taken from one of six registers is used as a pointer into one of two descriptor tables. The descriptor table entry pointed to by the selector contains a base address which is added to the original EA to form a VA. The X86 reference material usually refers to the EA as an "offset", the combination of the selector and EA as a "logical address", and the VA as a "linear address".

Page translation is also different in the two architectures. In the PowerPC architecture, VAs are translated to physical addresses (PAs) via a hashed page table search. The lower thirty-nine bits of the virtual segment ID plus the page field from the VA are hashed and then masked/merged with a page table origin register to form the real address of the page table group in memory. The individual page table group entries are searched until an entry is found whose virtual segment ID matches that of the original VA. When found, the real page number is extracted from the page table group entry and concatenated with the byte field of the original VA to form the 64-bit PA.

In the X86 architecture, the VAs are translated to PAs via a direct, two-level page table lookup. The high order ten bits of the VA are used as a pointer into a page directory table whose base is determined by a page directory register. The entry in the page directory table referenced by the VA contains the base address for a page table. The middle ten bits of the VA are used as a pointer into this page table. The page table entry referenced by this pointer contains the real page number of the physical page in memory corresponding to the virtual page being translated. The real page number is combined with the offset field of the VA to form the final PA.

Finally, a dual-architecture multitasking processor must be able to manage the context in which external and asynchronous interrupts are taken as well as any synchronous exceptions, or faults. The X86 and PowerPC architectures define two different schemes for interrupts and exceptions.

The PowerPC architecture defines a single location in which control is transferred as a result of an external interrupt. The burden is placed on software to determine what the vector number of the interrupt is by querying the system. All interrupts and faults are taken in real-address mode in one of two possible memory locations. The return address is stored in a register for use by the interrupt return instruction.

For more information on the PowerPC, the reader is referred to *PowerPC Architecture Specification for a New Family of RISC Processors*, IBM Corporation ICN 1-55860-C16-6 (® IBM Corp. 1993, 1994), published by Morgan Kaufman Publishing Co., San Francisco, Calif., which is incorporated herein by reference.

SUMMARY OF THE INVENTION

It is therefore an object of the present invention to provide a processor which supports two distinct architectures under a single multi-tasking operating system.

Another object of the invention is to provide a single microprocessor which enables extensions and/or limitations (restrictions) to each of two distinct architectures and controls the architectural context under which the processor operates.

It is another object of the invention to provide a microprocessor capable of qualifying the instruction set definitions for two supported architectures so that resources defined in each architecture may be accessed by software written for the other architecture.

It is a further object of the invention to provide a microprocessor which determines an architectural context under which execution resources operate such that the execution context may be dynamically switched from one architecture to another.

It is yet another object of the invention to provide a microprocessor that supports two distinct architectures and which has a mode control unit that initializes the microprocessor in a known state from which software may access various mechanisms to enable/disable a qualifying mode control and influence an architectural context control mechanism.

It is still another object of the invention to provide a microprocessor that supports two distinct architectures and which has memory management hardware capable of performing address translation from virtual to real addresses for both architectures and is designed to allow address translation to take place such that the translation mechanism may be switched from one architecture to another.

It is still another object of the invention to provide a microprocessor that supports two distinct architectures and which has memory protection checking hardware capable of performing memory protection checks for both architectures and allows memory protection checks to take place in a manner such that memory resources of one architecture may be protected from memory resources of the other architecture.

It is yet a further object of the invention to provide a microprocessor that supports two distinct architectures and which determines the architectural context under which interrupts and exceptions are taken such that the interrupt context may be switched from one architecture to another.

According to the invention there is provided a microprocessor which runs under a single multitasking operating system and supports first and second architectures having separate and distinct instruction sets and memory management schemes. The microprocessor comprises instruction set management means that decodes instructions in a first instruction set of the first architecture and decodes instructions of a second instruction set of the second architecture. The instruction set management means maps decoded instructions in the first instruction set to one or more instructions in the second instruction set. The microprocessor further includes memory management means that performs address translation from virtual to real addresses for said first and second architectures. Control means detects an architectural context of a program being read from memory as being either code for said first architecture or code for said second architecture and, depending on the detected architectural context, controls the instruction set management means and said memory management means to dynamically switch between address translation for the first or second architectures and executing one or more mapped decoded instructions or directly decoded instructions of the second architecture.

In a specific implementation of the invention, the microprocessor is provided with an architecture mode control unit which enables extensions and limitations to the two architectures. These extensions and limitations allow the following:

Enablement of new instructions and extensions to existing instructions in one architecture to allow full access into unique resources of the other architecture.

Full visibility of one architecture into the resources of another architecture.

A single address translation mechanism in effect such that the translation of addresses for one architecture may be mapped onto the translation of another architecture.

A mapping of the protection mechanism of one architecture onto that of the other architecture.

A unified interrupt and exception mechanism that allows asynchronous interrupts and page translation and protection related exceptions to be handled by a single mechanism regardless of the architectural context in effect when the interrupt or exception occurred.

Additionally, the architecture mode control unit controls the architectural context (context control) under which the processor operates by controlling the following areas of the processor:

There is a single instruction fetch mechanism shared by the two architecture modes, and separate instruction decode mechanisms for each architecture which are active only when appropriate for the given context control. However, such a context control can be used on implementations with multiple instruction fetch mechanisms and/or single, multi-architecture decoders.

All execution resources are common between the two architecture modes. However, such a context control can be used on implementations without shared or common resources. For example, an implementation may have separate X86 and PowerPC architecture register files. The context control would be used to select the appropriate register file for operand and result accesses.

A single memory management unit (MMU) is implemented using a format common to the two supported architectures. However, such a context control can be used on implementations with multiple MMUs to drive translations through the MMU appropriate to the architecture given by the context control. The page protection mechanism to be used by the processor MMU when protecting supervisor-level code from user-level code.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention will be described, by way of example, as a specific implementation of a RISC processor, the IBM PowerPC family of processors, modified to support the memory management scheme and instruction set of a CISC processor, the Intel X86 family of processors. It will be understood, however, that the invention could be applied to other and different processors. Moreover, the teachings of the invention may be applied to a combination of a pair of RISC processor architectures or a combination of CISC processor architectures, each having different memory management schemes and instruction sets. Those skilled in the art will also recognize that the invention can be extended to support for multiple processor architectures.

Figure 1:
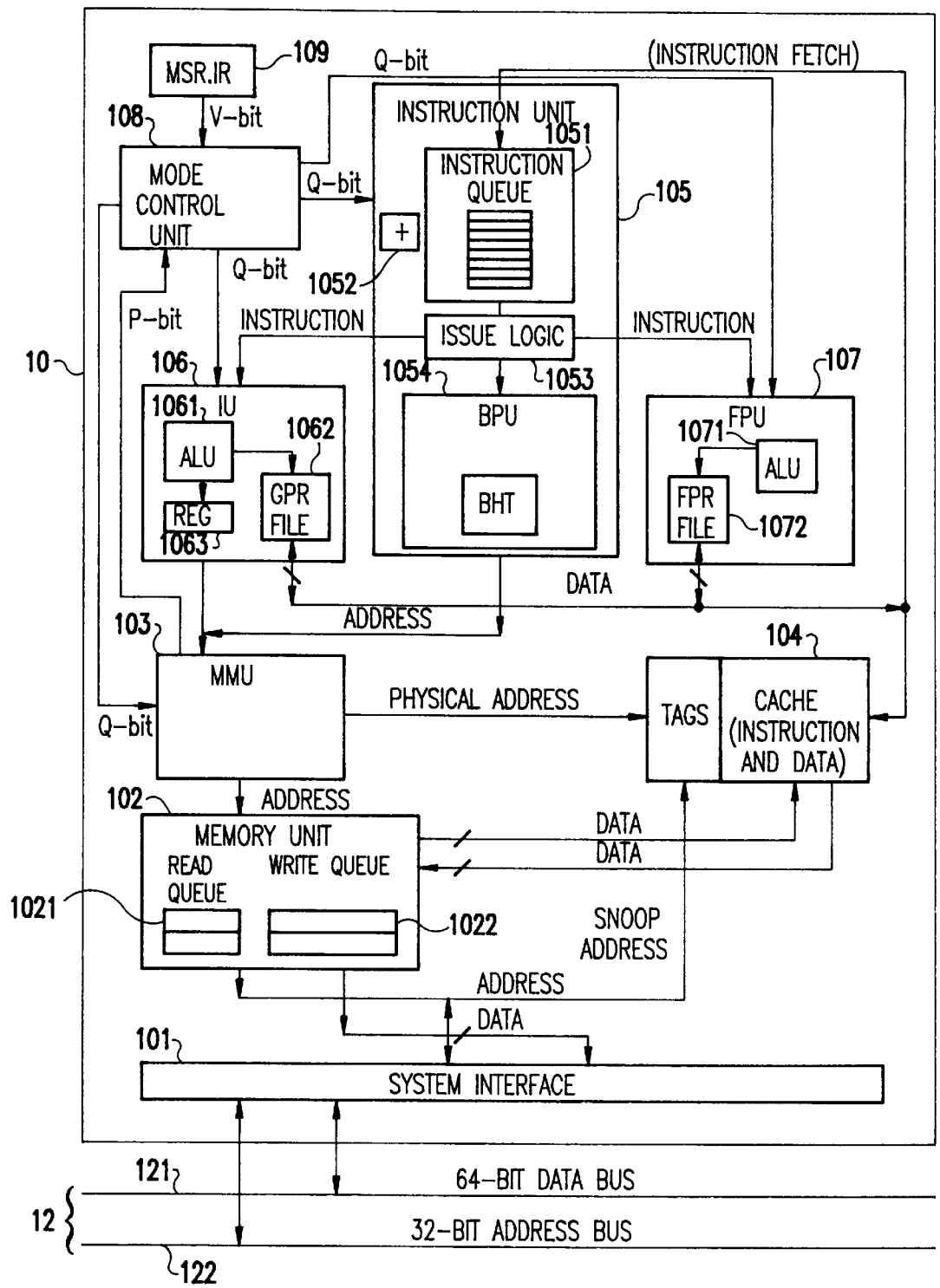
FIG. 1 is a block diagram of a microprocessor on which the invention may be implemented.

Referring now to the drawings, and more particularly to FIG. 1, there is shown a block diagram of the basic microprocessor, such as the PowerPC microprocessor, on which the present invention may be implemented. The following discussion provides the fundamental operation of the microprocessor.

The microprocessor 10 is connected via its system interface 101 to a system bus 12 comprising a 64-bit data bus 121 and a 32-bit address bus 122. The system bus 12 is connected to a variety of input/output (I/O) adapters and a system memory (not shown). The microprocessor 10 uses the system bus 12 for performing reads and writes to system memory, among other things. Arbitration for both address and data bus mastership is performed by a central, external arbiter (not shown).

The system interface 101 is connected to a memory unit 102, which consists of a two-element read queue 1021 and a three-element write queue 1022. The read queue 1021 contains addresses for read operations, and the write queue 1022 contains addresses and data for write operations. The memory unit 102 is, in turn, connected to and receives addresses from a memory management unit (MMU) 103. The memory unit 102 is also connected to a cache 104 which stores both instructions and data. Instructions and data (operands) in cache 104 are accessed by the instruction unit 105, consisting of an instruction queue 1051, program counter 1052, issue logic 1053, and branch prediction unit (BPU) 1054 having a branch history table (BHT).

The issue logic 1053 determines the type of instruction and dispatches it to a corresponding one of a plurality of execution units, here represented by an integer unit (IU) 106 and a floating point unit (FPU) 107. The IU 106 includes an arithmetic logic unit (ALU) 1061 which performs scalar (i.e., integer) operations and stores results in a general purpose register (GPR) file 1062. Similarly, the FPU 107 includes an ALU 1071 which performs floating point operations and stores results in a floating point register (FPR) file 1072. The data outputs from each of the GPR file 1062 and the FPR file 1072 are written to cache 104 from where the data is transferred to the memory unit 102 for writing to system memory. In addition to data calculations, the IU 106 also calculates addresses for accessing by the instruction unit 105 and temporarily stores these addresses in a register 1063. The addresses in register 1063, along with addresses output by the BPU 1054 are supplied to the MMU 103.

The instruction unit 105 also processes interrupts (asynchronous events initiated by hardware external to the processor) and exceptions and faults (synchronous events occurring as a result of fetching, decoding or executing an instruction). Interrupts are sent to the microprocessor 10 via the system interface 101 and forwarded to the issue logic 1053. Exceptions and faults (hereafter referred to simply as "exceptions") may be detected by either instruction queue 1051, memory management unit 103, IU 106, or FPU 107 and forwarded to issue logic 1053. The issue logic 1053 prioritizes exceptions and signals them to the branch prediction unit 1054 on instruction boundaries. The branch prediction unit 1054 then changes the location from which instruction unit 105 fetches instructions to that of the appropriate interrupt/exception handler.

Instructions and operands are automatically fetched from the system memory via the cache 104 into the instruction unit 105 where they are dispatched to the execution units at a maximum rate of three instructions per clock. Load and store instructions specify the movement of operands to and from the integer and floating-point register files and the memory system. When an instruction or data access is made, the logical address (effective address) is calculated by the instruction unit 105 (for instruction accesses) or integer unit 106 (for data accesses). The memory management unit 103 translates the effective address to a physical address and forwards that to the cache 104. While translating the effective address to a physical address, the memory management unit 103 also checks the current privilege of the microprocessor 10 to verify that the memory may be accessed. A portion of the physical address bits are compared with the cache tag bits IN 104 to determine if a cache hit occurred. If the access misses in the cache 104, the physical address is used to access system memory.

In addition to loads, stores and instruction fetches, the microprocessor 10 performs other read and write operations for table searches, cache cast-out operations when least-recently used (LRU) sectors are written to memory after a cache miss, and cache-sector snoop push-out operations when a modified sector experiences a snoop hit from another bus master. All read and write operations are handled by the memory unit 102. To maintain coherency, the write queues 1022 are included in snooping. Memory is accessed through an arbitration mechanism that allows devices to compete for bus mastership.

Microprocessor 10 also contains a mode control unit 108 which controls the architectural context under which the various units operate as well as any architectural qualifications or extensions that might be placed on those units under a given architectural context. The memory management unit (MMU) 103 detects to which architecture an instruction conforms. For example, the MMU 103 may determine whether an instruction is an X86 instruction or a PowerPC instruction and informs the mode control unit 108 of the architectural context accordingly via a page mode control (P) bit. The mode control unit 108 also receives a virtual (V) bit from the PowerPc machine state register instruction relocation (MSR IR) bit 109. The mode control unit 108 generates and holds and holds a qualification (Q) bit. The Q bit is output to the instruction unit 105 and determines how instruction unit 105 fetches and decodes instructions. The Q bit is also output to the integer unit (IU) 106 and the floating point unit (FPU) 107 and determines which register resources are available to integer unit 106 and floating point unit 107. The Q bit from mode control unit 108 also governs how branch prediction unit 1054 redirects instruction unit 105 when interrupts/exceptions occur. Based on the P and V bits and the Q bit generated internally by the mode control unit 108, the mode control unit also generates a mode switch signal which controls the point in a currently running program in one architecture when a mode switch is made to a different program for running in the other architecture.

Extensions to an architecture might include new instructions and registers. Limitations might include the disabling of access to certain registers, or a restriction on how addresses are translated. The primary purpose behind the extensions and/or limitations is to allow software written in each architecture to have some level of access to resources defined by the other architecture. A secondary purpose is to allow software written in each architecture to transfer control to software written in the other architecture as the architectural context changes. In fact, the extensions enabled by the architecture mode control unit 108 include mechanisms that allow software to invoke a change in architecture context.

The architecture context of the processor is simply the current instruction-set architectural context under which the processor operates. In a processor which supports both the PowerPC and X86 architectures, for example, the context control determines whether the processor behaves like a PowerPC or an X86 processor. Both the architecture qualifying control (which enables extensions/limitations) and the architecture context control (which determines context) may have a direct influence over each of the

- instruction set definition mechanisms,
- instruction encoding mechanism,
- instruction opcode length mechanism,
- address translation mechanism,
- segment and page table organization mechanism,
- protection mechanism,
- interrupt architecture mechanism,
- memory addressability mechanism,
- register sets and register mechanism, and conditions, fields and results mechanism.

In the preferred embodiment of the invention, the mode control unit 108 is controlled by a single MMU 103 which is capable of mapping the address translation of one architecture onto that of the other. The mode control unit 108 further controls memory protection checking hardware so that software written for both architectures may be protected and multi-tasked under the control of a single operating system.

Figure 2:
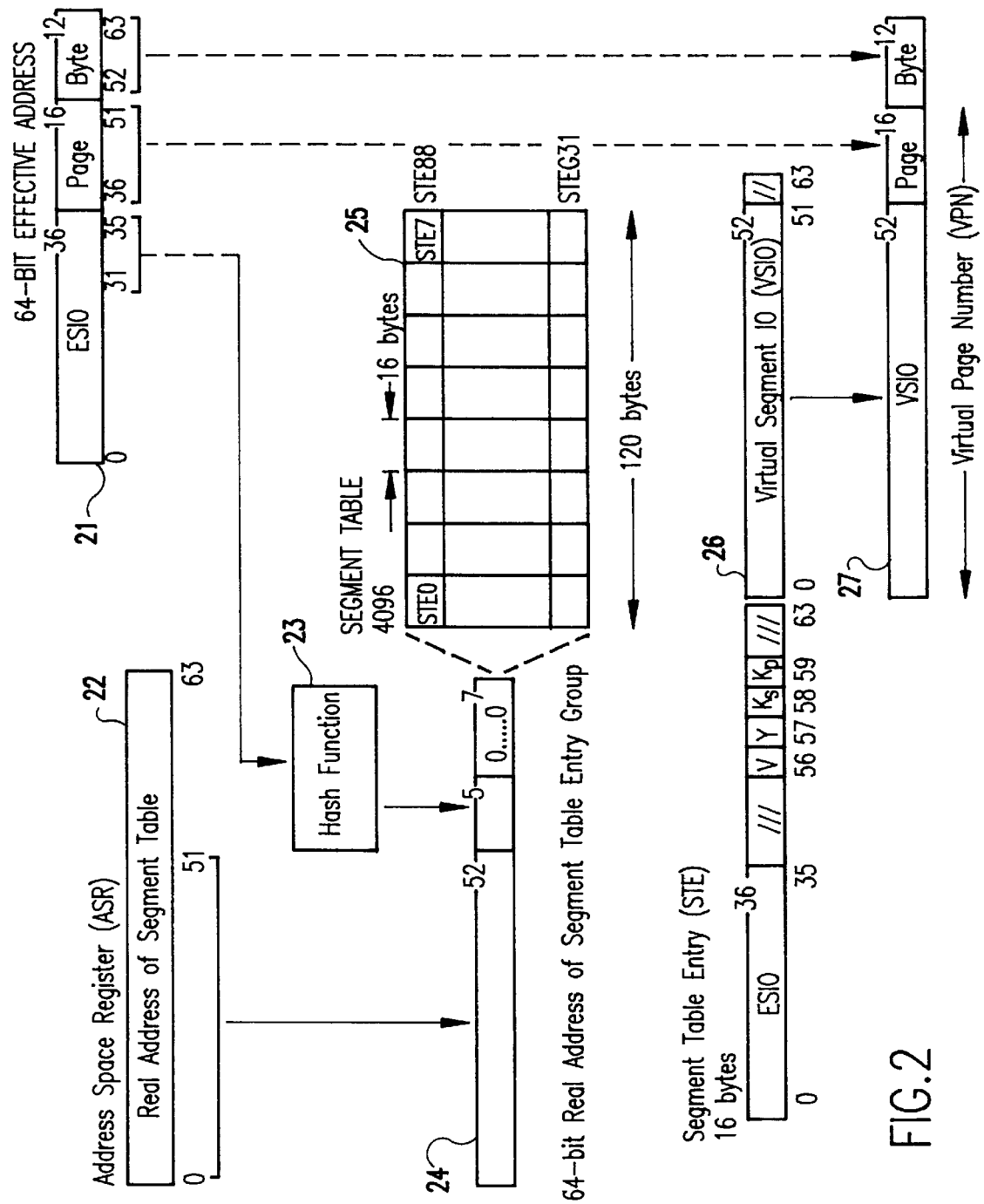
FIG. 2 is a block diagram showing the effective to virtual address translation (segmentation) in the PowerPC architecture.

FIG. 2 is a block diagram of that part of the PowerPC architecture which performs effective to virtual address translation (segmentation). The 64-bit effective address is held in register 21, while address space register (ASR) 22 holds the real address of the segment table. The lower five bits of the effective segment identification (ESID), bits 31 to 35, extracted from the EA register 11 are hashed by a hash function 23 and then concatenated with bits 0 to 51 of ASR 22 to form the real address in segment table entry register 24, the last byte of which is forced to zero. The segment table entry register 24 addresses the segment table 25 in memory which comprises 4096 bytes. Effective addresses (EAs) are translated to virtual addresses (VAs) via the hashed segment table search. The individual segment table group entries are searched until an entry is found whose effective segment ID matches that of the original EA. When found, the virtual segment ID is extracted from the segment table group entry 26 and concatenated with the page and byte fields of the original EA to form the 80-bit VA in register 27.

Figure 3:
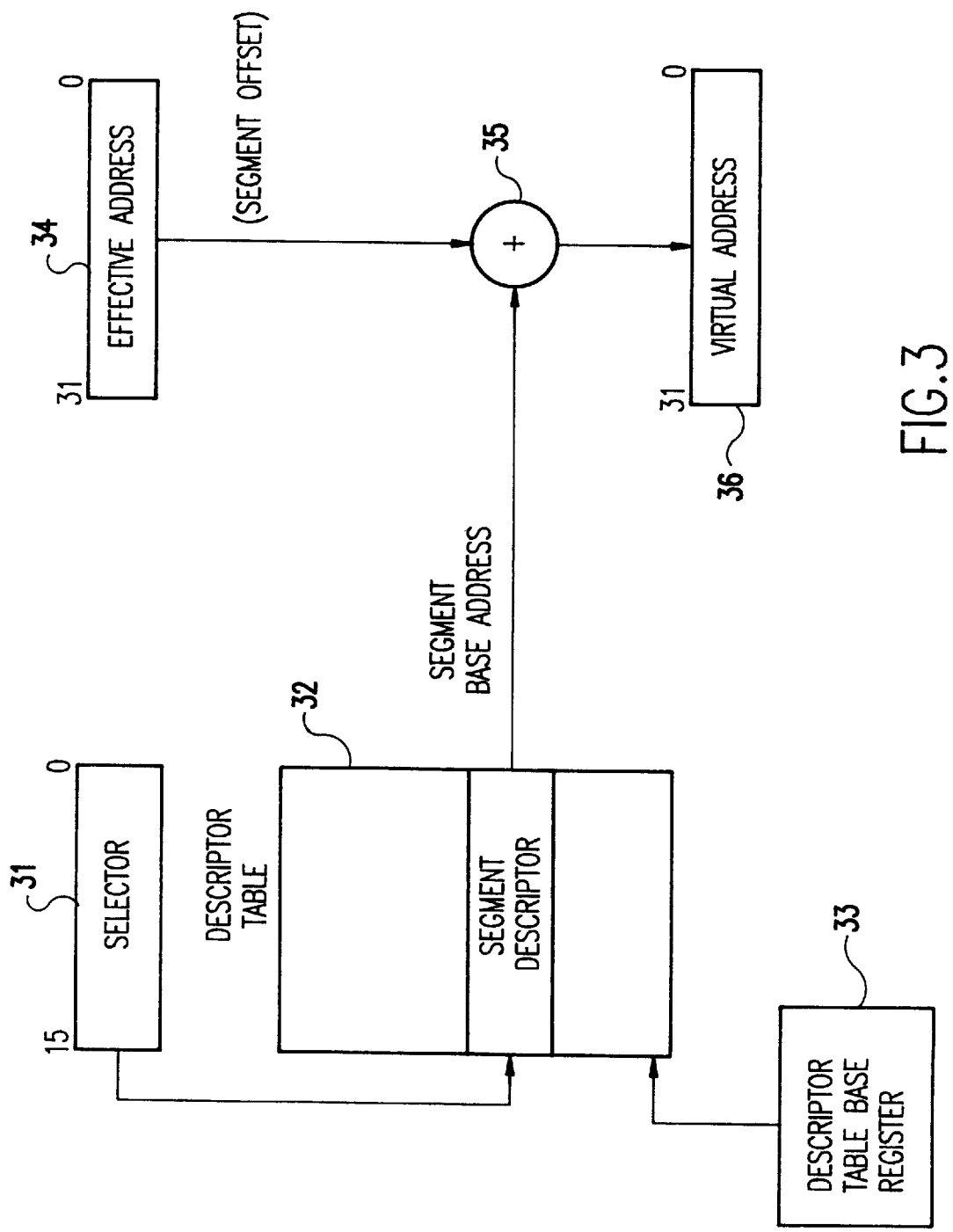
FIG. 3 is a block diagram showing the effective to virtual address translation (segmentation) in the X86 architecture.

In X86 architecture address translation as shown in FIG. 3, EAs are translated to VAs via a direct segment table lookup. A selector value taken from one of six registers 31 is used as a pointer into one of two descriptor tables 32. The descriptor table entry pointed to by the selector contains a base address which is read from descriptor table base register 33 and added to the original EA in EA register 34 by adder 35 to form a VA in VA register 36. The X86 reference material usually refers to the EA as an "offset", the combination of the selector and EA as a "logical address", and the VA as a "linear address".

Figure 4:
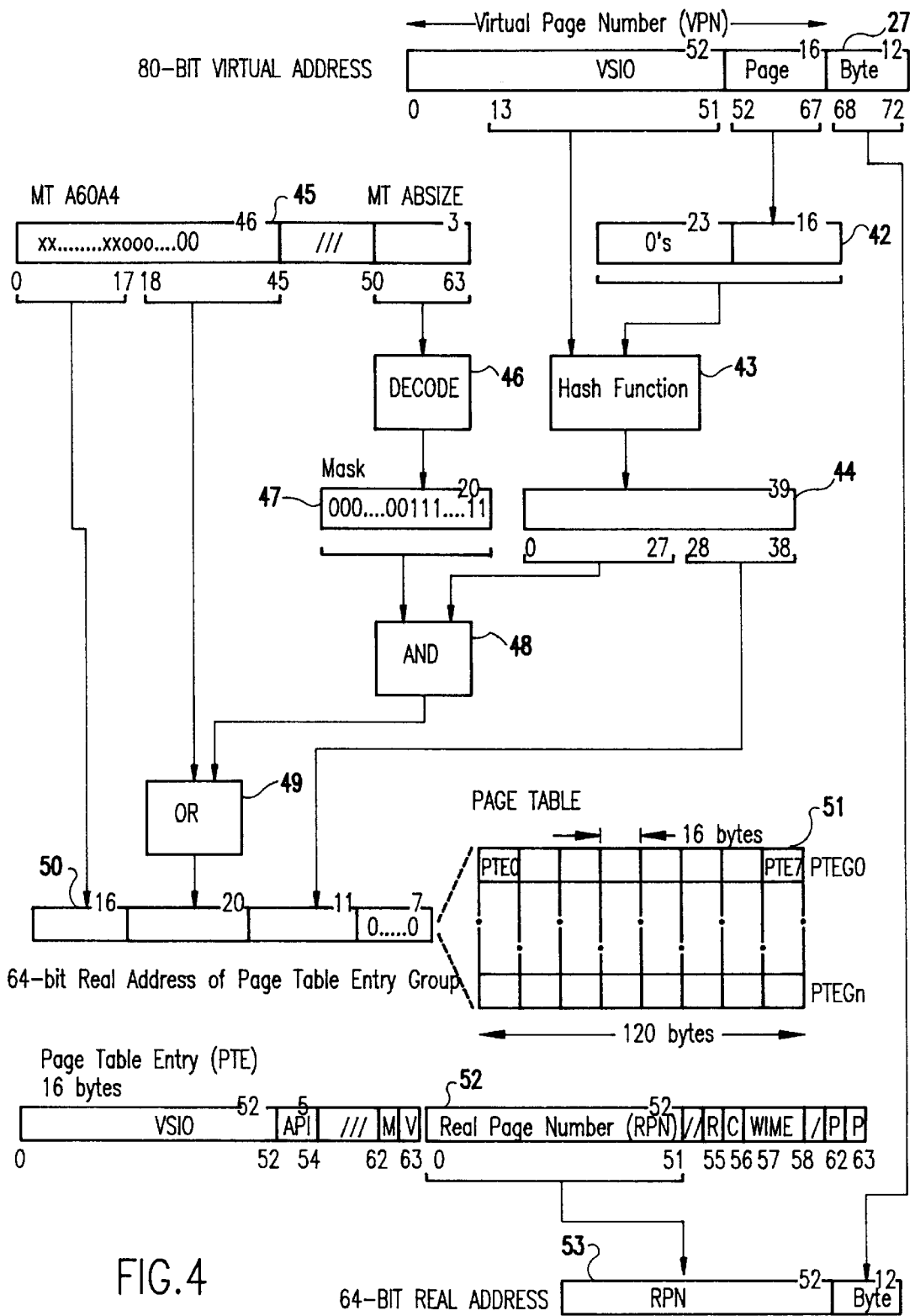
FIG. 4 is a block diagram showing the virtual to physical address translation (paging) in the PowerPC architecture.

Page translation is also different in the two architectures. In the PowerPC architecture as shown in FIG. 4, VAs in register 27 are translated to physical addresses (PAs) via a hashed page table search. More particularly, bits 52 to 67 (page field) of the 80-bit virtual address in register 27 are concatenated with 23 zeros in register 42. Then bits 13 to 51 of the virtual segment ID in register 27 and the content of register 42 are hashed in hash function 43 to generate 39 bits in register 44. Bits 58 to 63 in hash table register 45 are decoded by decoder 46 to generate a 28-bit mask in register 47. Bits 0 to 27 of register 44 are masked by the mask in register 47 in AND gate 48 and the masked output is merged with bits 18 to 45 of register 45 in OR gate 49 to form the mid 28 bits in page table origin register 50. The first 18 bits of register 50 are read directly from bits 0 to 17 of register 45, and the next higher 11 bits are read from bits 28 to 38 of register 44. The highest seven bits of register 50 are forced to zero to form the real address of the page table 51 in memory. The individual page table group entries are searched until an entry 52 is found whose virtual segment ID matches that of the original VA. When found, the real page number is extracted from the page table group entry 52 and concatenated with the byte field of the original VA, bits 68 to 79 of VA register 27, to form the 64-bit PA in physical address register 53.

Figure 5:
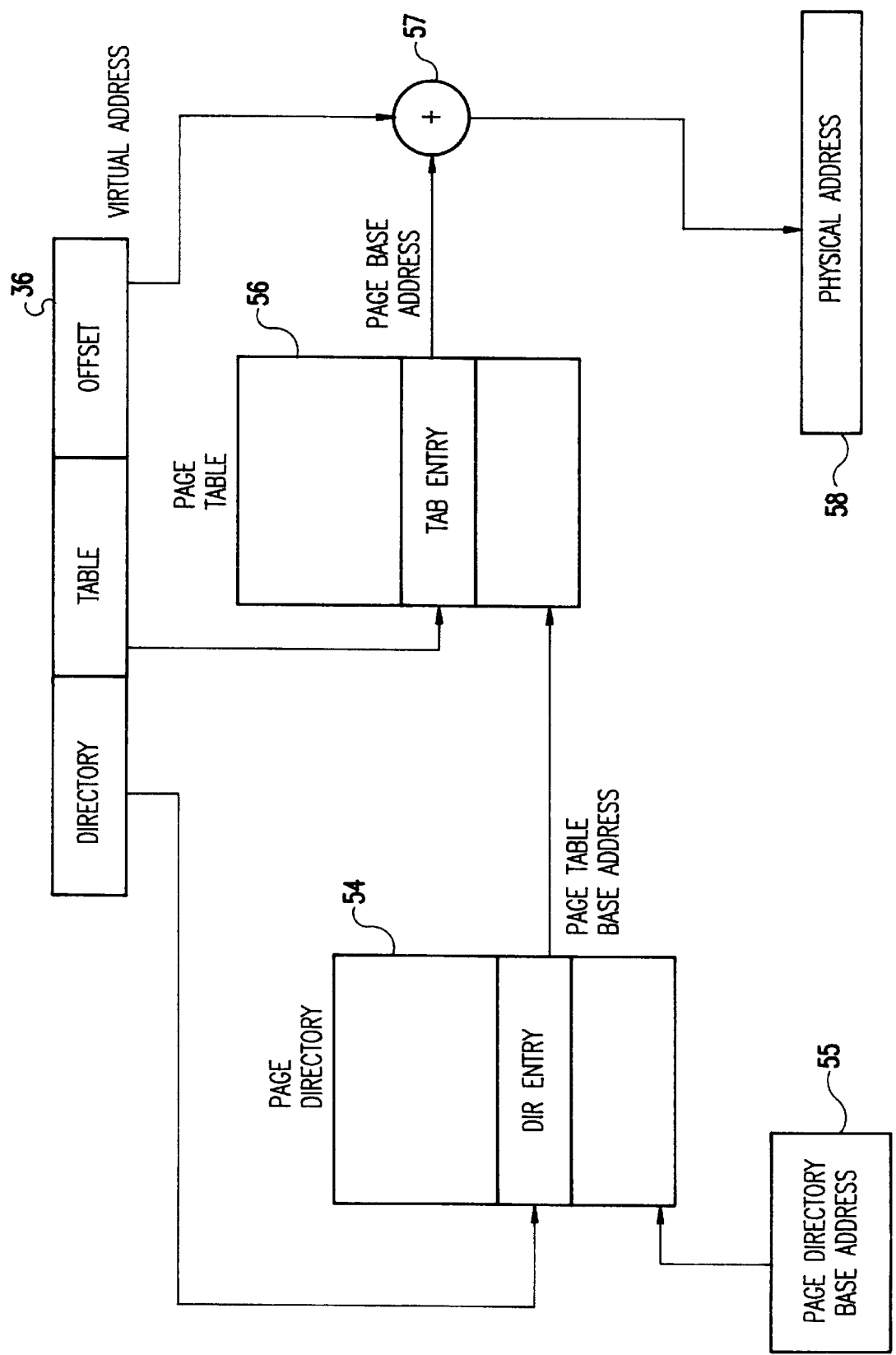
FIG. 5 is a block diagram showing the virtual to physical address translation (paging) in the X86 architecture.

In the X86 architecture as shown in FIG. 5, the VAs are translated to PAs via a direct, two-level page table lookup. More particularly, the high order ten bits of the VA in VA register 36 are used as a pointer into a page directory table 54 whose base is determined by a page directory register 55. The entry in the page directory table 54 referenced by the VA contains the base address for a page table 56. The middle ten bits of the VA in register 36 are used as a pointer into this page table 56. The page table entry referenced by this pointer contains the real page number of the physical page in memory corresponding to the virtual page being translated. The real page number is combined by adder 57 with the offset field of the VA in register 36 to form the final PA in physical address register 58.

In order to achieve the implementation of two architectures that can run on a single microprocessor, there are several essential elements that need to be controlled by the mode control unit 108 shown in FIG. 1. Specifically, the mode control unit 108 handles cases where we have two architectures which differ in

- instruction set definition, encoding, and opcode length,
- address translation,
- segment and page table organization,
- protection mechanism,
- interrupt architecture,
- memory addressability,
- register sets, and
- conditions, fields and results mechanism.

In all areas in which the architectures differ, the processor implementation may contain hardware that individually supports the differing aspects of each architecture, or it may contain common hardware resources which are capable of supporting all architectures, to eliminate redundancy of hardware resources. In situations where distinct hardware elements are used to support the architectures, the architecture mode control unit 108 is responsible for enabling the appropriate hardware element and disabling the other elements. For example, if the processor implements separate instruction set decoders for each of the supported architectures, the architecture mode control unit will enable the instruction set decoders for the architecture currently in use and disable the decoders for the remaining architectures. In situations where common hardware resources are utilized to eliminate redundancy, the architecture mode control unit will direct such hardware to operate under the rules of the current architecture context, when appropriate, making use of any extensions defined for that context. For example, if the processor implements a common register file in order to minimize physical hardware and wiring, then the architecture mode control until will control which registers in the common register file may be accessed under any given hardware context.

Therefore, according to the invention, the mode control unit 108 selects between hardware resources which individually support the differing aspects of a single architecture. The control unit 108 also controls those common hardware resources which are capable of supporting the differing elements of multiple architectures, those hardware resources being implemented to eliminate redundant hardware thereby saving physical space, power consumption, improving processor performance, and simplifying the overall design.

The architecture qualifying control mechanism is determined by the value of a bit held in processor feature control register (shown in FIG. 6) in the mode control unit 108. This bit may be set by software running in either architecture. When this bit is zero, no qualifications are placed on either of the architectures, e.g., the PowerPC architecture or the X86 architecture; that is, this the normal state of operation. When this bit is one, however, it qualifies the architecture presently running under the control of the architecture context control mechanism. More particularly, when this bit is one, the microprocessor has available new instructions in the current architecture which allow the microprocessor to read and write registers in the other architecture that are not defined by the current architecture.

As an example, the X86 architecture has a status/control register called FLAGS which is not present in the PowerPC architecture. So a new PowerPC instruction is defined that allows the microprocessor to read and write the FLAGS register, and this instruction may be used only when the qualifying control bit is one. Likewise, this bit disables some instructions in the current architecture. As an example, when the qualifying control signal is a one, the PowerPC architecture no longer recognizes the X86 architecture INVLPG (invalidate page table entry in the TLB) instruction, when the architecture context is X86 mode. When the qualifying control mechanism is one and the context control mechanism is zero (PowerPC architecture mode), extensions to the PowerPC architecture are enabled that give it access to the X86 architected resources.

For example, enhancements are made to the instruction fetch mechanism of the PowerPC architecture that allow software designed for a PowerPC processor to branch to byte-aligned X86 software. Additional PowerPC processor instructions are enabled that allow software designed for a PowerPC processor to read and write the 64-bit X86 descriptor registers. Finally, extensions to the PowerPC processor paging mechanism are enabled that allow an operating system to differentiate memory locations that contain code designed for a PowerPC processor from those locations that contain X86 code.

Figure 6:
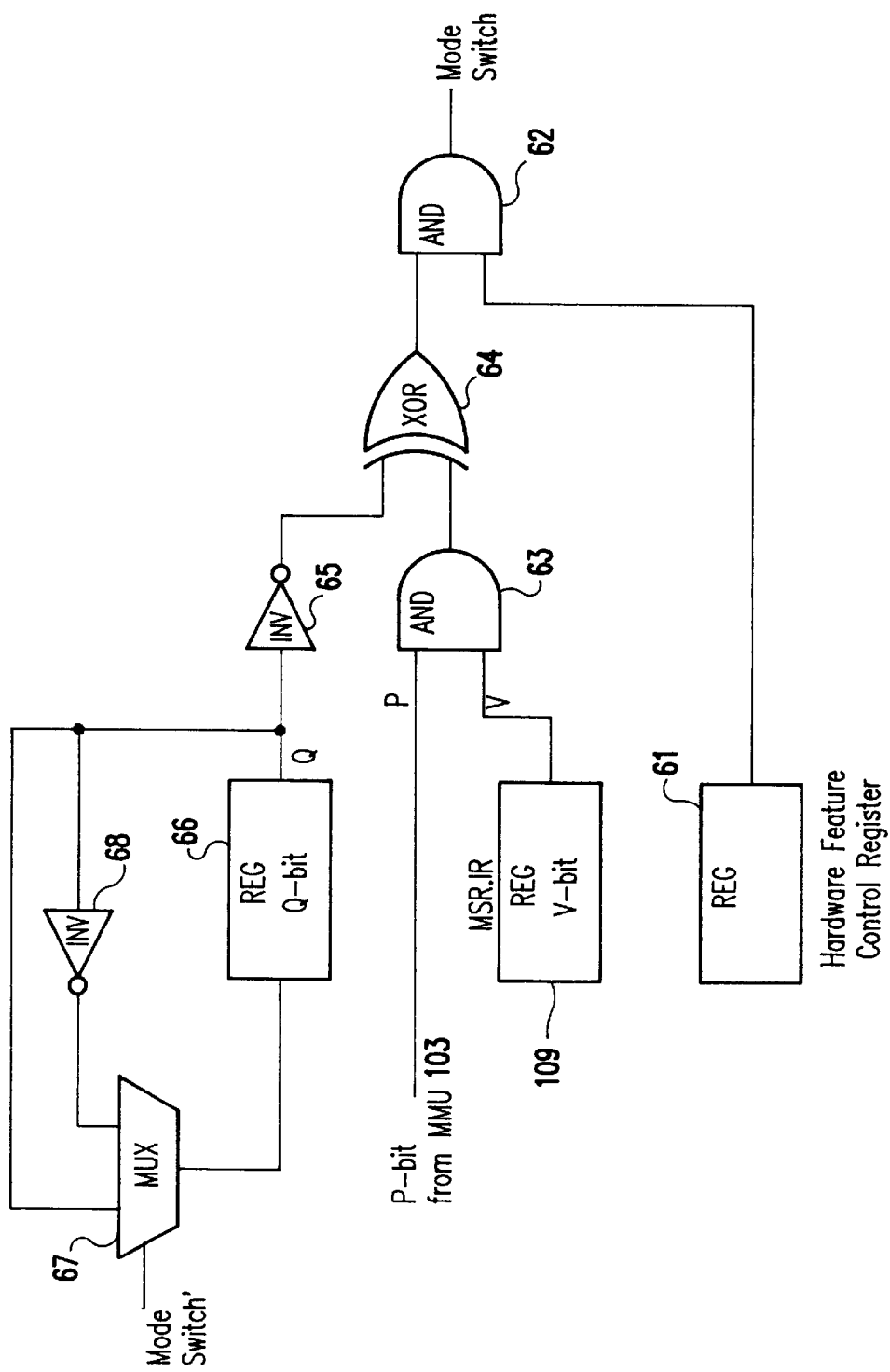
FIG. 6 is a logic diagram showing the relevant logic of an exemplary mode control unit in FIG. 1.

FIG. 6 is a logic diagram showing the relevant logic of an exemplary mode control unit 108. The hardware feature control register 61 is a latch which is set by software, as explained above. When the latch is set, it enables AND gate 62 which outputs the mode switch signal. The mode switch signal is the signal that enables an architectural context switch at the completion of the current code being processed. The mode switch signal is generated depending on states of the V bit, the P bit and the Q bit. The V (virtual mode) bit is input to the mode control unit 108 via the PowerPC machine state register instruction relocation (MSR IR) bit 109 (see FIG. 1) and indicates whether PowerPC instruction address translation is enabled (V=1) or disabled (V=0). The P (page mode control) bit is supplied by the MMU 103 and indicates whether the current page is a PowerPC page (P=0) or an X86 page (P=1). The Q bit is the architecture qualifying bit. This bit is supplied to the instruction unit 105, the integer unit (IU) 106 and floating point unit (FPU) 107, as shown in FIG. 1. The P bit and the V bit are input to AND gate 63, the output of which is supplied to one input of exclusive OR (XOR) gate 64. The second input of XOR gate 64 is supplied by inverter 65 connected to register 66 which stores the Q bit. The output of register 66 is supplied directly to one input of multiplexer (MUX) 67 and, via inverter 68, to the other input of MUX 67. The MUX 67 is controlled by a delayed mode switch signal (as indicated by the prime symbol) from the branch prediction unit (BPU) 1054 (FIG. 1), as shown and described in more detail with reference to FIG. 9.

The initial values (i.e., at hardware reset) are V=0, P=X, Q=0, and register 61=0, where X means "don't care". The mode switch signal is enabled by setting register 61 to one. When the Q bit is zero and the hardware feature control register 61 is also set to one (X86 architecture mode), certain limitations are placed on the X86 address translation mechanism. Specifically, the X86 paging function is disabled, and it is replaced by the full PowerPC address translation mechanism of segment and page translation. The X86 segment translation mechanism is still utilized.

Certain other paging-related operations are also disabled. Specifically, X86 writes to the page directory base register have no effect, the X86 page translation mode cannot be enabled, and X86 software cannot invalidate entries held internally by the MMU 103 in FIG. 1. Instead, these operations are trapped internally by the processor and handled as appropriate. Extensions to the X86 architecture are also enabled by the architecture qualification mechanism state bit. Specifically, X86 instructions may access certain PowerPC architected registers.

Architectural context control in the microprocessor is determined by the value of the Q bit generated by the mode control unit 108 and held in register 66. For example, when this bit is zero, the microprocessor follows the full set of rules associated with the PowerPC architecture, from instruction fetch and decode to execution to address translation to interrupt and exception handling. When this bit is one, the processor follows the full X86 architectural rules. In the preferred embodiment, the initial value of this bit after reset is zero, placing the processor in a mode in which the full X86 architecture is followed.

Figure 7:
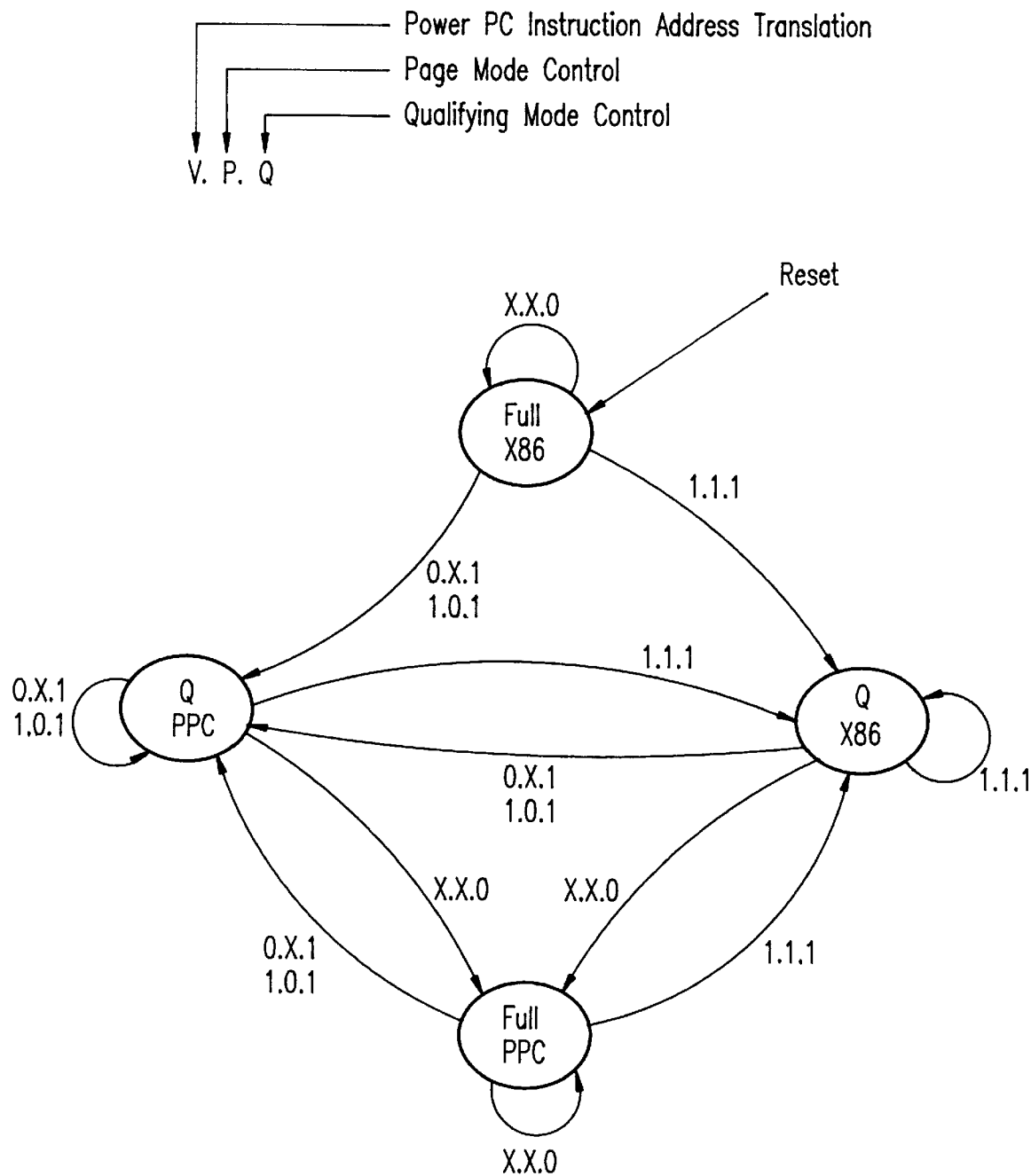
FIG. 7 is a state diagram showing how the architecture mode control unit generates the architecture context control.

The value of the Q bit may be changed by the architecture mode control unit 108 to place the microprocessor in PowerPC mode while running in X86 mode, or X86 mode while running in PowerPC mode. This is accomplished by MUX 67. FIG. 7 shows a state diagram of how the preferred embodiment's mode control unit 108 may change the value of the architectural context control signal. FIG. 7 shows four states; full X86 architecture mode, qualified X86 architecture mode, qualified PowerPC architecture mode, and full PowerPC architecture mode. In the preferred embodiment, the mode control unit 108 uses the value of the V, P and Q bits to advance the processor from one architectural context to another. As mentioned, the Q bit is held in register 66 and may be set by software running in either of the two architectures. The bit V is also under software control and is cleared on exception. The bit P is supplied to mode control unit 108 by the MMU 103.

In the preferred embodiment, a reset of the microprocessor from any of the architectural contexts will put the processor in full X86 mode. That is to say, if the microprocessor is reset, the context and qualifying control mechanisms are put to some known and initial state. In the preferred embodiment, a reset leaves the processor in X86 context with no qualifications. If Q (see FIG. 7) is never set to one, the processor will never leave full X86 mode. However, if V, P and Q are all set to one, the microprocessor will enter qualified X86 mode, and will stay in that mode as long as V, P, and Q remain one. Qualified PowerPC mode may be entered from either full X86 mode or qualified X86 mode using one of two methods; either by setting V to zero while Q is one, or by setting V and Q to one while setting P to zero. Full PowerPC mode may be entered from either of the qualified modes if Q is set to zero.

Figure 8:
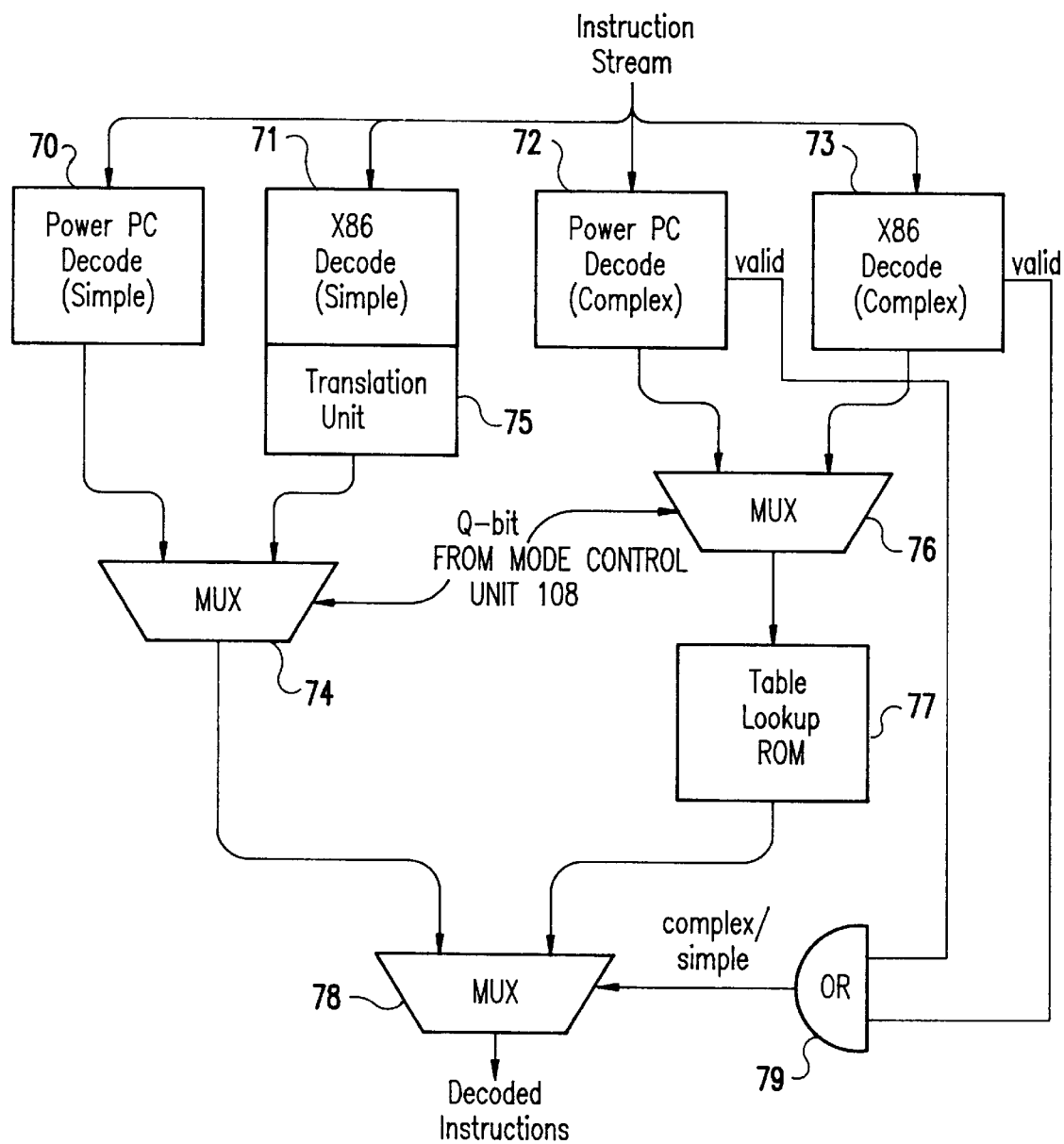
FIG. 8 is a high level block diagram showing the data flow of the microprocessor's instruction unit.

FIG. 8 is a high level, functional block diagram showing the data flow of the issue logic 1053 (FIG. 1) to illustrate the instruction set management operation of the microprocessor. This is the data flow of the hardware shown in more detail in FIG. 9, described in more detail hereinafter. On power up or reset, the microprocessor enters an initialization mode, which begins by assuming a default mode. In the preferred embodiment, the default mode is the full X86 mode, as shown in FIG. 7, which is hardwired into the mode control unit 108. The MMU 103 is initially clear. On power up or reset, instruction code is retrieved via the system interface 101 and bus 12 from main memory. This code is supplied to the instruction unit 105 via the normal data path described above.

The instruction code is supplied in parallel to decode function block 70, which handles simple PowerPC instructions, decode function block 71, which handles simple X86 instructions, decode function block 72, which handles complex PowerPC instructions, and decode function block 73, which handles complex X86 instructions, as shown in FIG. 8. In the example being described, "simple" instructions are those which map to a basic operation class and can be handled by a single execution unit. For example, a load operation, a store operation and single arithmetic operations are all simple instructions. All other instructions are, by this definition, "complex". For example, an X86 repeat move string or a PowerPC load multiple word are examples of complex instructions. The outputs of decoding function 70, i.e., decoded simple PowerPC instructions, are supplied to one input of multiplexer (MUX) 74. The outputs of decoding function 71, i.e., decoded simple X86 instructions, are first supplied to a translation unit 75 (e.g., a table lookup ROM) which outputs corresponding simple PowerPC instructions to the second input of MUX 74. The outputs of decoding functions 72 and 73 are supplied to a multiplexer (MUX) 76, the output of which is supplied to a microcode read only memory (ROM) 77.

The ROM 77 has tables of instructions for both complex decoded PowerPC and X86 instructions. For complex PowerPC decoded instructions, the ROM 77 outputs multiple, simple PowerPC decoded instructions. A complex decoded X86 instruction output from MUX 76 is mapped to corresponding multiple, simple PowerPC instructions in ROM 77. Thus, the outputs of MUX 74 and the ROM 77 are one or more simple PowerPC instructions. The Q bit from mode control unit 108 (FIGS. 1 and 6) controls the multiplexers 74 and 76 to select either PowerPC or X86 decoded instructions output, respectively, by the decoding functions 70, 72 and 71, 73. The outputs of MUX 74 the ROM 77 are supplied to a third MUX 78, which is controlled by OR gate 79. The OR gate 79 receives a "valid" output from one of the decoding functions 72 or 73 when a "complex" instruction is detected by that function. Although not shown, these "valid" signals are also qualified by the Q bit. Thus, the output of the OR gate selects between complex and simple instructions; that is, between the output of ROM 77 and the MUX 74.

In order to set up the X86 and PowerPC qualified modes (see FIG. 7), the initialization software performs the following steps:

set the hardware feature control register to one in order to perform an immediate context switch to Power PC mode from the default X86 mode, initialize the PowerPC virtual environment (i.e., set up the necessary page tables in external memory and initialize the BATs and segment registers), enable instruction relocation by setting the instruction relocation (IR) bit in the machine state register (MSR) to one, thus enabling virtual translation of instruction addresses, and performing a branch instruction to the appropriate software mechanism that will handle application start up (e.g., either X86 or PowerPC code).

After hardware reset, the processor will be executing in X86 mode (the default); therefore, the Q bit will be set to zero by the mode control unit 108, and the hardware feature control register will also be initialized to zero. Initialization software should subsequently set the hardware feature control register to one in order to enable context switching. Since instruction relocation is off (i.e., the V bit is zero), this will also force the mode control unit 108 to perform a context switch from executing X86 code to executing PowerPC code. The next sequential instruction that follows the feature control register write will be executed as a PowerPC instruction.

Next, during the initialization process, the page table 52 (FIG. 4) is set up and entries made to enable the qualified PowerPC mode (FIG. 7) that will become effective once instruction relocation is enabled (i.e., the MSR IR bit is set to one, resulting in the V bit being set to one). This also requires the PowerPC segment registers and BAT registers to be initialized to their appropriate values. Then, the X86 descriptor tables should be initialized for use by X86 applications. Finally, instruction relocation would be enabled by setting the IR bit in the PowerPC MSR register to one, thus setting the V bit to one. The last instruction would be a branch instruction to a memory location that starts the first program. The target code can be either X86 or PowerPC code. Which ever it is, the code is managed in 4KB blocks.

When the branch instruction executes, the values for Q and V will be Q=1 (executing PowerPC code) and V=1 (instruction relocation/virtual translation enabled). Hence, the subsequent state of the Q bit will be determined by the mode control unit 108 from the accessed value of the P bit from the page table entry corresponding to the target of the branch instruction, the value of the P bit being provided to the mode control unit 108 from the MMU 103. At this point, the software initialization is complete.

Once initialization is complete, the MMU 103 performs a TLB lookup. If the lookup results in a hit and the P bit is a one, the MMU 103 knows that the code is X86 code and informs the mode control unit 108 and returns the status via the page mode control bit, P, thus directing the mode control unit as to the context mode. What can be seen from this flow is that the incoming instruction causes the MMU 103 to switch the mode of the mode control unit 108 when the instruction is located in the MMU 103 or added to the MMU. In other words, the addressing scheme of the MMU 103 drives the mode control unit 108 to change in mode. If, however, the incoming instruction is not in the TLB (a miss), a page table walk is performed to find the instruction in main memory lookup table. If it is not there either, a special interrupt is made and handled.

Assuming that the instruction is in the page table, it is loaded in the MMU 103 and, if the P bit is different from the current context mode, the MMU 103 switches the mode of the mode control unit 108, as described above. The MMU 103 always overrides the mode control unit context mode. If this instruction is the next instruction to be executed, then the mode switch occurs. The switch between the qualified PowerPC mode to the qualified X86 mode (FIG. 7) is made by informing the mode control unit 108 via the P bit (P=1). Now the mode control unit 108 tells the integer unit (IU) 106 and the floating point unit (FPU) 107 that all instructions are to be interpreted as X86 instructions. More particularly, the address translation mechanisms and the segment and page table organization mechanisms are in the IU 106. The mode control unit 108 tells the IU 106 how many registers there are and what format the registers use. The mode control unit 108 tells the FPU 107 whether to use 80-bit X86 style or 64-bit PowerPC style, thereby controlling the precision of the same register files.

Figure 9:
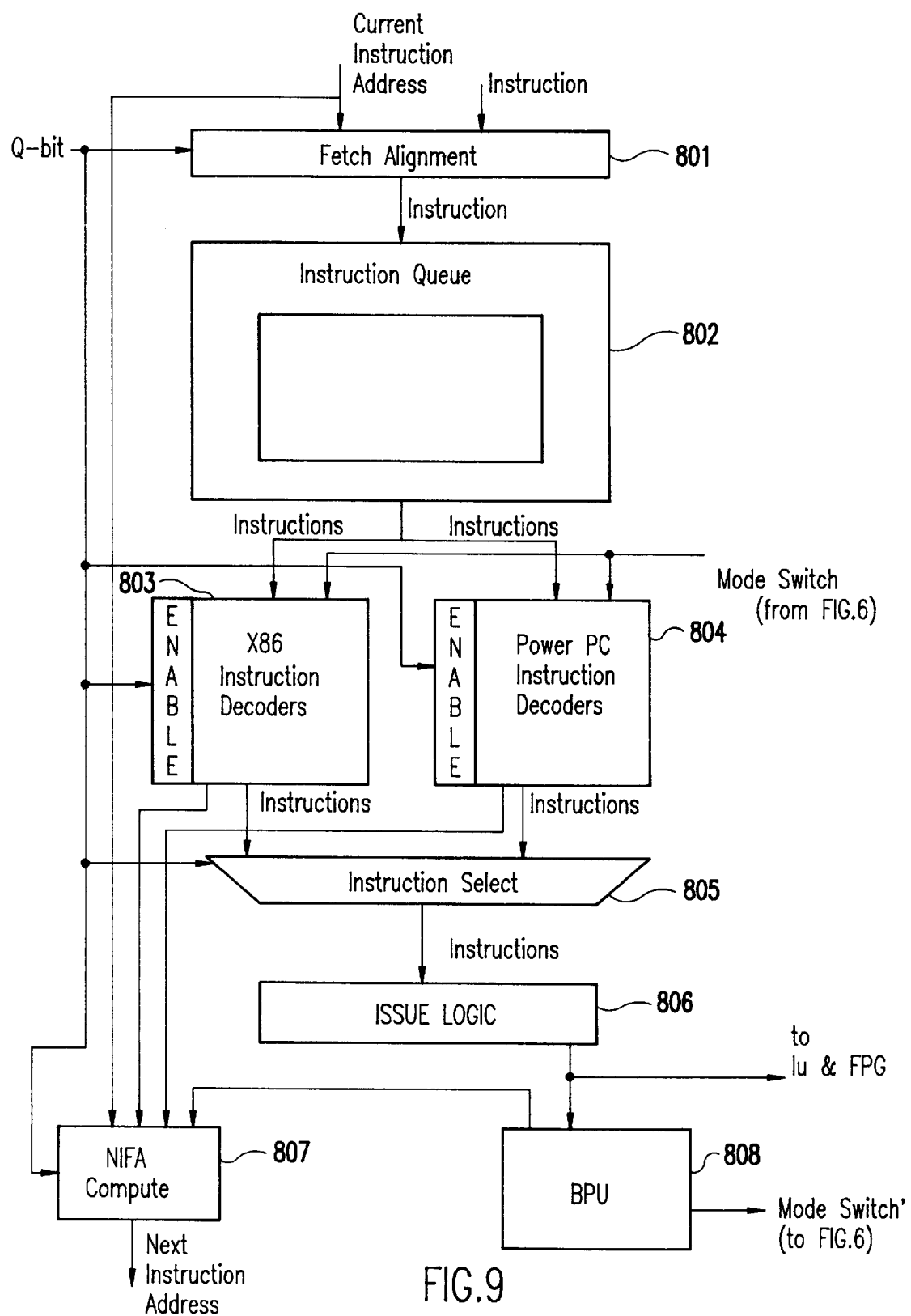
FIG. 9 is a block diagram of the microprocessor's instruction unit.

FIG. 8 shows how the instruction stream comes into the instruction unit and how it is decoded. The mode control unit controls the selection of decoded instructions through the issue logic. FIG. 9 is a detailed hardware block diagram of the instruction unit 105 which performs the functions illustrated in the functional block diagram of FIG. 8. The instruction queue 1051 in FIG. 1 includes the fetch aligner 801 and the instruction queue 802 shown in FIG. 9. Fetch aligner 801 is connected to the instruction fetch bus and has as inputs instructions and the current instruction address taken from the instruction cache. The Q bit from mode control unit 108 is used to determine how instructions are aligned by the fetch alignment hardware 801 prior to being transferred to the instruction queue 802 since fetch alignment requirements differ between the PowerPC and X86 architectures. For example, X86 instructions may contain anywhere from one to fifteen bytes and be aligned on any byte boundary whereas PowerPC instructions are always four bytes in length and are therefore always aligned on a 4-byte boundary. The fetch alignment hardware 801 must be able to shift instructions from the instruction fetch bus by the appropriate amount based on the current instruction's length and address. In addition, since X86 instructions may vary in length and may be aligned anywhere on the instruction fetch bus, an X86 instruction may overflow one instruction cache entry and fall into the next entry. The architecture mode control signal is used to allow the fetch alignment hardware 801 to merge and align instructions from consecutive instruction cache entries into the instruction queue 802.

Instructions are forwarded from instruction queue 802 to the X86 instruction decoders 803 and PowerPC instruction decoders 804. The X86 instruction decoders 803 perform the decode functions 71 and 73 of FIG. 8, while the PowerPC decoders 804 perform the decode functions 70 and 72. The Q bit is used to enable either the X86 instruction decoders 803 or PowerPC instruction decoders 804, depending on the desired architectural context, as explained with reference to FIG. 8. The decoders are used to translate all instructions into a common set of instructions whose execution is supported by the microprocessor. For example, an X86 "ADD EAX,EBX" instruction and a PowerPC "add r8,r8, r11" instruction will both be translated by their respective decoders to a common "add r8,r8,r11" instruction. More complex instructions are handled by the respective decoders 803 or 804 which generate sequences of simple instructions which perform the function of the single, more complex instructions. For example, the PowerPC instruction decoders 804 will emulate a PowerPC load-multiple word instruction as a sequence of individual loads.

The Q bit from mode control unit 108 also has a direct effect on the decoders 803 and 804, as described with reference to FIG. 9. Specifically, new instructions are enabled in the PowerPC architecture which allow PowerPC software to manage the X86 floating-point environment and to read and write the X86 descriptor registers. In the X86 architecture, the Q bit disables the X86 instructions which enable page translation, initialize the page directory base register, and invalidate entries in the TLB. The Q bit also enables extensions to existing PowerPC instructions which allow PowerPC software to branch directly to X86 software located anywhere in memory. Specifically, the instructions which branch to addresses stored in the PowerPC branch instructions normally ignore the low-order two bits of the register since all PowerPC instructions are located on 4-byte boundaries. X86 instructions, however, are byte-aligned, so PowerPC branches cannot reach instructions which lie on one, two or three byte boundaries. The Q bit solves this problem by enabling the low-two bits of the branch address registers previously mentioned, thereby allowing PowerPC code to branch to byte-aligned addresses.

The common instructions generated by decoders 803 and 804 under the control of the Q bit have a direct effect on the operation of execution resources, such as the integer unit (IU) 106 and floating point unit (FPU) 107 (FIG. 1). The X86 decoders 803 may generate common instructions that use only a subset of the registers in GPR 1062 (FIG. 1) and FPR 1072 (FIG. 1) whereas PowerPC decoders 804 may generate common instructions that make use of all the registers. Further, while the Q bit controls the context of the two architectures, a number of registers used by one architecture may be accessed by the other architecture. Specifically, PowerPC software may read and write all X86 registers, whereas X86 software may read and write the PowerPC MSR, BATs and decrementer register.

From X86 instruction decoders 803 and PowerPC instruction decoders 804, the decoded common forms of the instructions are transferred to issue logic 806 via instruction selection logic 805, which is controlled by Q bit, as described with reference to FIG. 8. Additionally, instruction length information is forwarded to the next instruction fetch address (NIFA) compute block 807. The NIFA compute block 807 is used to calculate the address of the next instruction which must be fetched from the instruction cache 104 (FIG. 1). It takes as its inputs the address of the current instruction from the instruction fetch bus, the instruction length from the two architecture decoders 803 and 804, and the architecture mode control signal which selects between the two instruction lengths. The branch processing unit (BPU) 808 (corresponding to BPU 1054 in FIG. 1) also has an input into NIFA compute block 807 which allows branch instructions to force the next instruction fetch address to the target of the branch.

The mode switch generated by the logic shown in FIG. 6 is input to the decoders 803 and 804. This signal acts as a pseudo instruction called "mode switch" instruction and serves as a place holder in the instruction stream. When the code for the current program completes, then the mode switch to the other architectural context can take place. The branch prediction unit (BPU) 808 detects this point in the code and outputs the delayed mode switch (mode switch') signal that enables the mode switch to finally take place. This signal is also fed back to MUX 67 (FIG. 6), causing the state of the Q bit in register 66 to switch, reflecting the mode switch.

Figure 10:
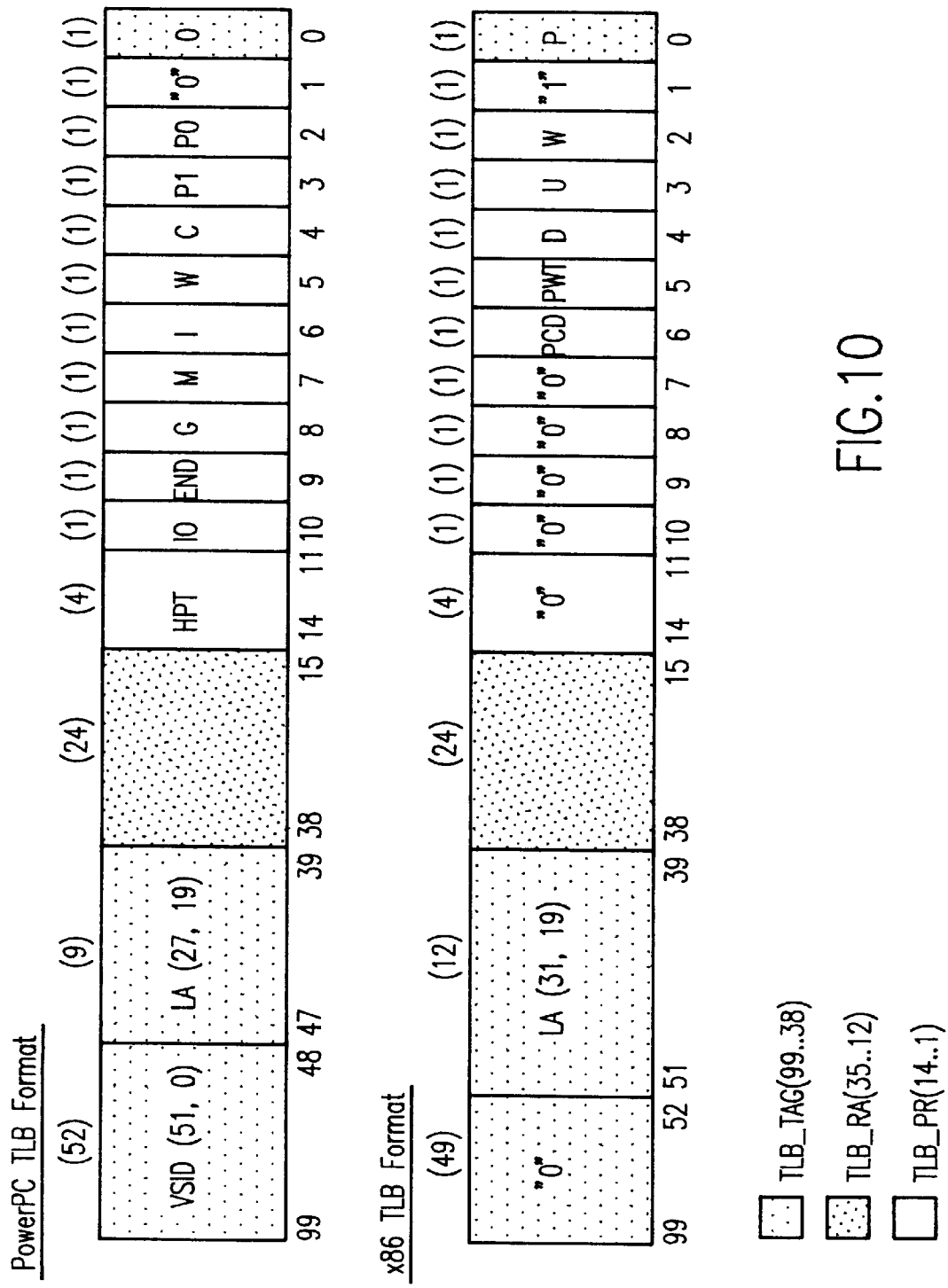
FIG. 10 is a block diagram contrasting the translation lookaside buffer (TLB) formats for the PowerPC and X86 page table entries.

The Q bit is also input to the memory management unit (MMU) 103 (FIG. 1) to control which of the address translation mechanisms is utilized by the microprocessor. The on-chip MMU 103 contains a single page table cache, or translation lookaside buffer (TLB), that is capable of storing either PowerPC or X86 page table entries in a common format. The setting of the Q bit determines how the TLB entries are initialized by the processor hardware and how they are interpreted during address translation. FIG. 10 shows the common format of the microprocessor's TLB entry and how page table entries in the PowerPC and X86 architectures are stored within.

In the present invention, the architecture qualifying control bit, Q, modifies the address translation mechanism used by both architectures. When the architecture qualifying control bit is one, extensions to the PowerPC paging mechanism are enabled that allow an operating system to differentiate memory pages that contain PowerPC code from those pages that contain X86 code. The root of the extension consists of the page mode control bit, P, in each PowerPC page table entry which defines each page as either a PowerPC page (bit set to zero) or an X86 page (bit set to one). This bit is used to drive the value of the architecture context control signal as described above and represented in FIG. 7.

As an instruction is fetched from memory, its address is first translated by the MMU 103 shown in FIG. 1. The MMU 103 returns status bits with the translated address, including the value of the page mode control bit, P. If the value of the page mode control bit is equivalent to the current value of the architecture qualifying control bit, the processor continues to operate as it did before, in the same architecture. However, if the value of the page mode control bit is different from the architecture qualifying control bit, instruction fetch and decode is halted until all previously fetched instructions are executed and completed without exceptions. Once they have completed, the value of the architecture mode control signal is changed to match that of the page mode control bit, and instruction fetch and decode is restarted under the new context established by the architecture mode control signal.

The enhancements to the PowerPC translation mechanism and the limitations placed on the X86 mechanism specifically allow a mapping of X86 address translation onto PowerPC address translation to provide a more dynamic environment for running software written for both architectures in a multi-tasking operating system. When the architecture qualifying control bit, Q, is set to one, the PowerPC address translation mechanism is "in control". What this means is that X86 segment translation will take place but, instead of performing X86 page translation, PowerPC segment and page translation will follow in order to form a PA. This allows a single operating system to manage address translation for software written for either architecture. The only restriction is that X86 software can not perform X86 paging-related work of its own.

A 64-bit PowerPC implementation will translate 64-bit addresses, while the X86 architecture as defined today generates 32-bit addresses. The invention provides a means for generating 64-bit addresses from 32-bit X86 addresses by concatenating a 32-bit register value as the high order 32 bits of the final 64-bit address. This allows the 32-bit X86 address space to be located anywhere in 64-bit space and, by dynamically changing the value of the register, allows an operating system to manage multiple X86 address spaces. In 32-bit implementations, this register value is ignored (i.e., it is effectively forced to zero).

Figure 11:
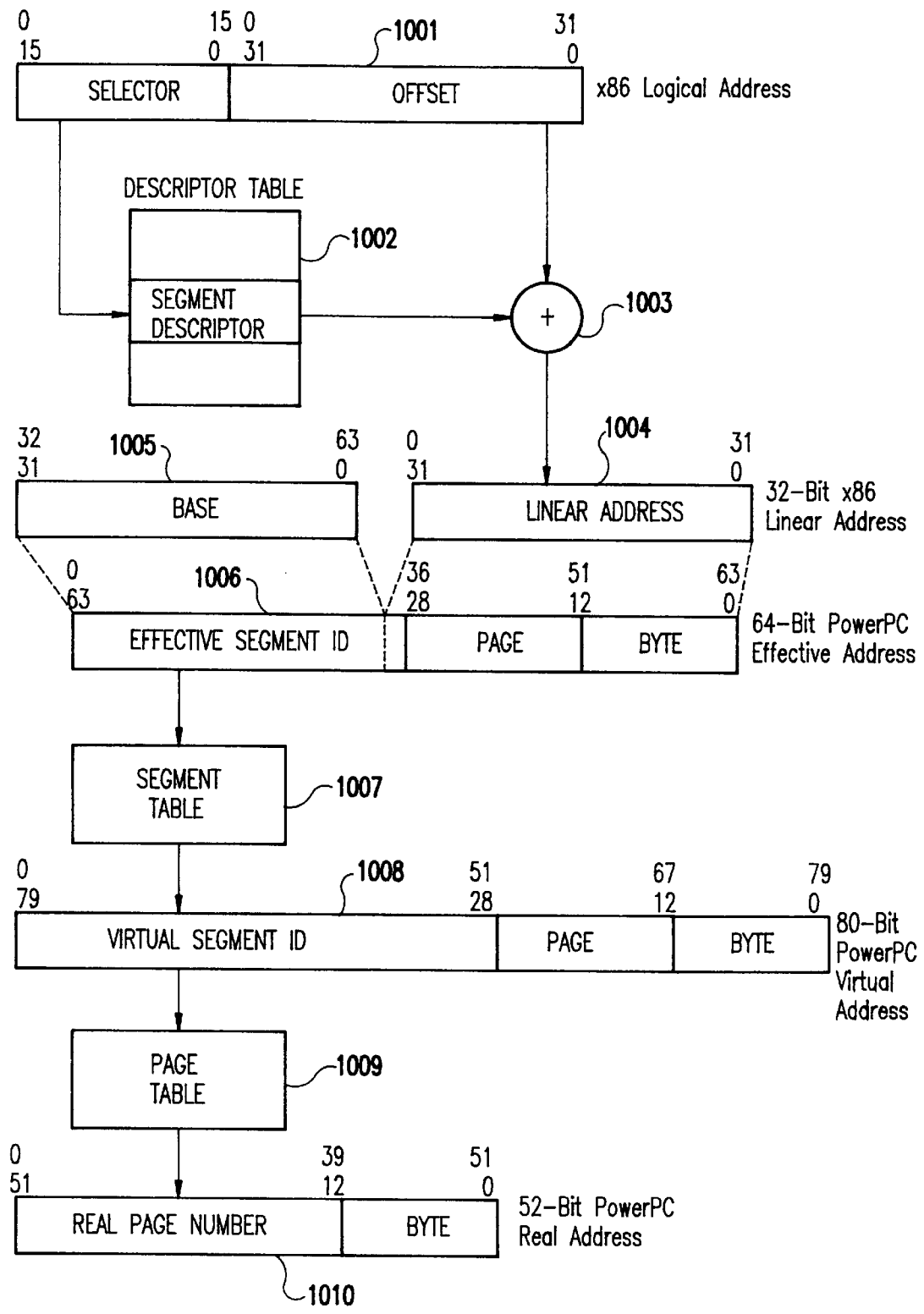
FIG. 11 is a block diagram showing X86 address translation is mapped to PowerPC address translation according to the invention.

FIG. 11 shows at a high-level how the two address translation mechanisms are merged using the method according to the invention and where in the process the 32-bit register value is concatenated to the X86 address in order to form a 64-bit address. Register 1001 holds the 32-bit offset and the 16-bit selector which comprise the X86 logical address. The selector is used to address the descriptor table 1002. The segment descriptor from table 1002 is combined in adder 1003 with the offset to generate the 32-bit X86 linear address in register 1004. The 32-bit X86 base address in register 1005 is read into the base 32 bits of the 64-bit PowerPC effective address register 1006. The 32-bit linear address in register 1004 is concatenated with the 32-bit base address in register 1006 to form the 64-bit PowerPC effective address. The effective segment ID from register 1006 is used to address the segment table 1007 to generate the 80-bit PowerPC virtual address in register 1008, as described with reference to FIG. 2. The virtual segment ID of register 1008 is used to address the page table 1009 to generate the 52-bit PowerPC real address as describe with reference to FIG. 4.

Figure 12:
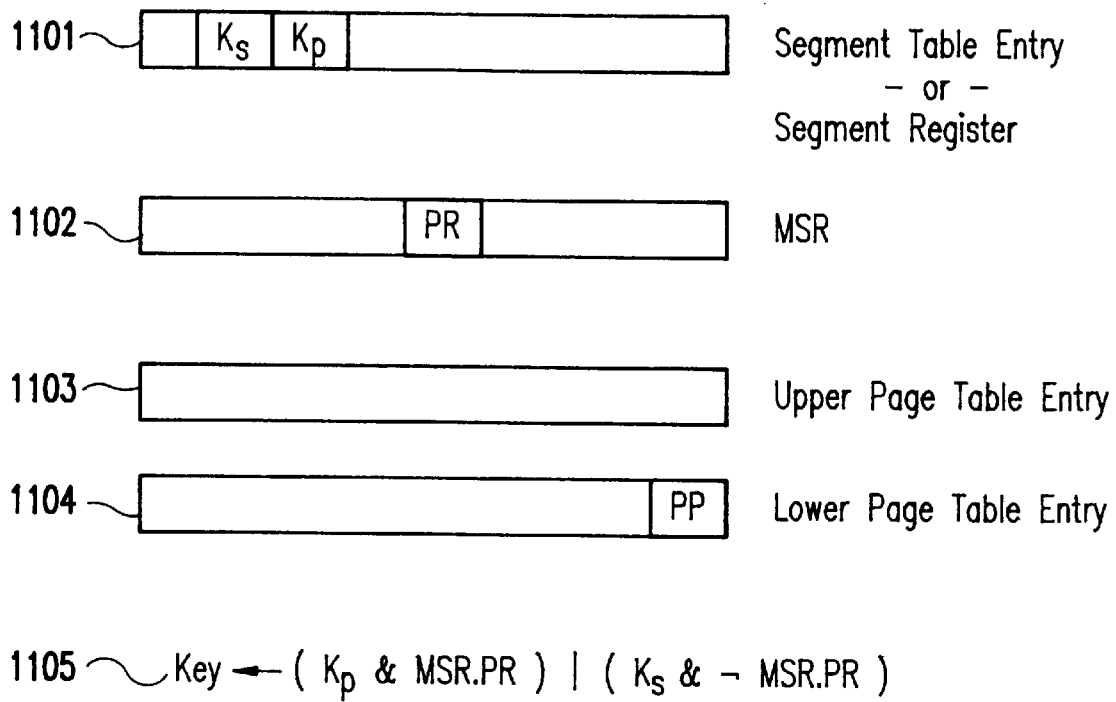
FIG. 12 is a set of tables and block diagrams showing the PowerPC paged memory protection checking rules.

The memory management unit 103 of FIG. 1 also is responsible for performing paged memory protection checks in the PowerPC and X86 architectures under the control of the architecture context control signal. FIG. 12 shows the PowerPC page protection mechanism. Protection information is gathered from three sources. The Ks and Kp segment protection bits found in the segment table entry 1101 (64-bit PowerPC) or segment register 1101 (32-bit PowerPC), the supervisor/user mode bit (PR) found in the PowerPC machine state register (MSR) 1102, and the PP page protection bits found in the lower page table entry 1104. A protection key 1105 is formed by ANDing the Kp segment protection bit with the MSR.PR supervisor/user mode bit and ORing that result with the AND of the Ks segment protection bit and the negation of the MSR.PR supervisor/user mode bit. Using the key 1105, the memory management unit 103 (FIG. 1) checks the value of the page protection PP bits to determine the type of access allowed, as shown in table 1106.

Figure 13:
FIG. 13 is a set of tables and block diagrams showing the X86 paged memory protection checking rules.
Figure 13:
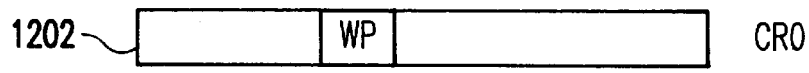
Figure 13:
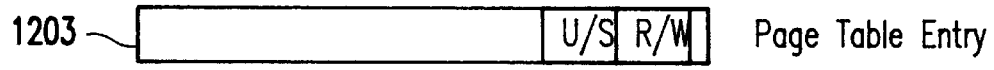

FIG. 13 shows how the X86 page protection mechanism works. Protection information is gathered from four sources; the descriptor privilege level of the current stack segment descriptor 1201 (this is often referred to as the current privilege level, or CPL), the write-protection bit WP from the register CR0 1202, the user/supervisor bit U/S from the page table entry 1203, and the read/write bit R/W, also from the page table entry 1203. Using this information, the memory management unit performs the check as shown in table 1204 to determine the type of access allowed.

In the present invention, the architecture qualification mechanism bit modifies only the protection mechanism used when the processor is running in X86 mode. Specifically, the X86 page protection mechanism is completely replaced by the PowerPC page protection mechanism since X86 page translation has been replaced by PowerPC page translation. In X86 mode, the qualification mechanism bit causes the PowerPC MSR PR bit to reflect the privilege of the X86 CPL. An X86 CPL of 0, 1, or 2 forces the MSR.PR to a value of 0 (supervisor) and an X86 CPL of 3 forces the MSR PR bit to a value of one (user). The protection key 1105 (FIG. 11) is then formed as described above. By forcing the MSR PR bit to track the CPL in X86 mode, X86 supervisor code may be protected from X86 and PowerPC user code. This allows portions of the operating system to be implemented in X86 code where convenient, since operating system software normally runs at a supervisor level.

Figure 14:
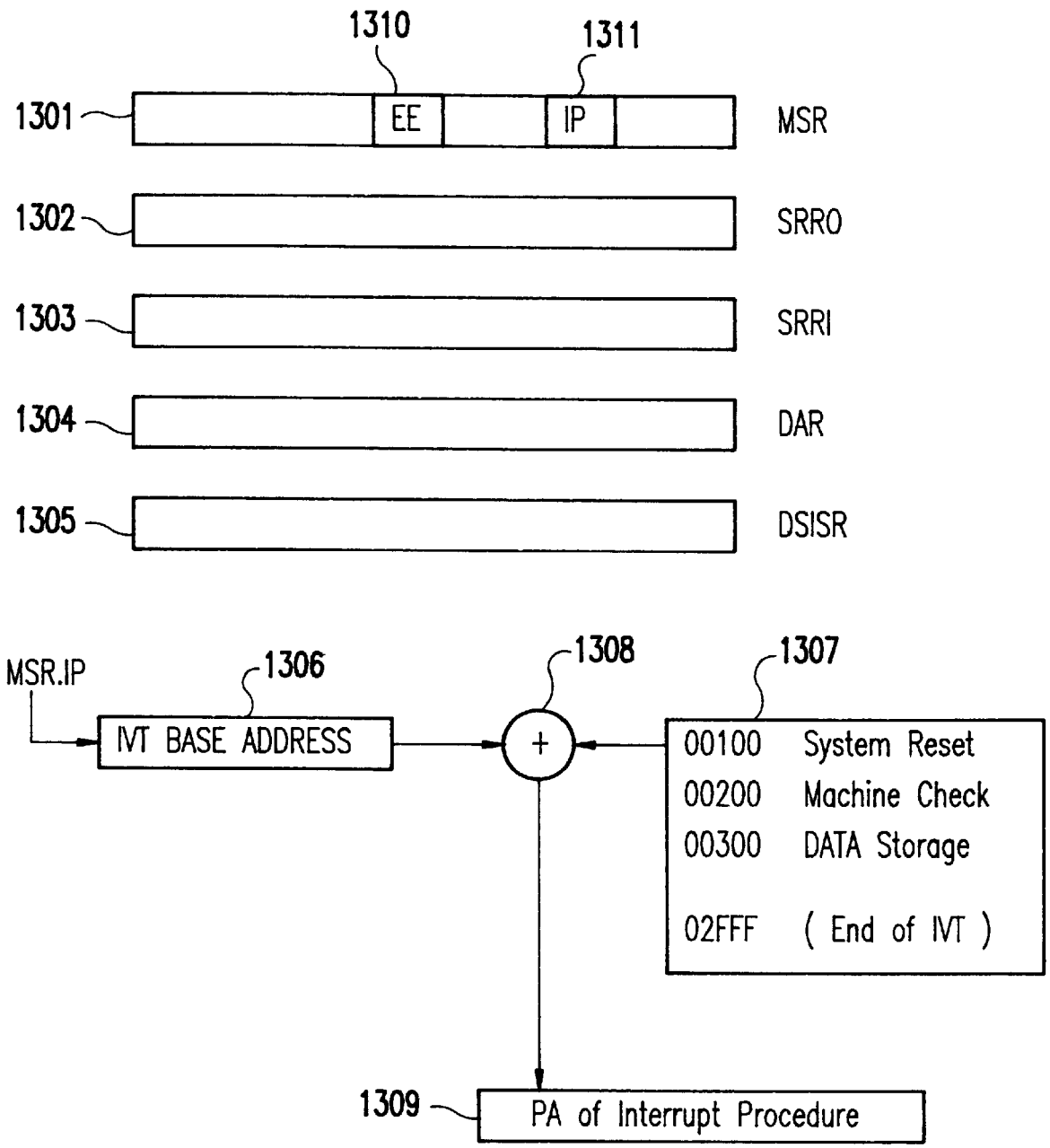
FIG. 14 is a block diagram showing the PowerPC interrupt status and control registers and interrupt vector table.

FIG. 14 is a block diagram of that part of the PowerPC architecture which controls the operation of interrupts and exceptions. Machine state register 1301 is used to enable and disable external interrupts via the EE bit 1310, and it is used to determine the location of the interrupt vector table 1307 in physical memory via the IP bit 1311. Register SRR0 1302 is used to record the effective address of the instruction that resulted in the exception or would have executed in the case of an interrupt. Register SRR1 1302 contains status information about the specific cause of an exception as well as certain bits in the MSR 1301 prior to the interrupt or exception. Register DAR 1304 holds the effective address of the data operand that caused an exception in data-related exceptions. Register DSISR 905 contains status information about the specific cause of a data related exception.

When an interrupt or exception is taken by the PowerPC architecture, the location of the interrupt procedure depends on the type of interrupt and the value of the MSR interrupt prefix (IP) bit 1311. The MSR IP bit 1311 specifies whether the interrupt vector table base address 1306 has a value of 0x00000000 or 0xFFF00000. This address is added to the offset into the vector table 1307 specified by the type interrupt to form the physical address of the interrupt procedure 1309. For example, if IVT base address 1306 is 0xFFF00000 and a data storage interrupt is taken, the physical address of the interrupt procedure 1309 will be 0xFFF00300.

Figure 15:
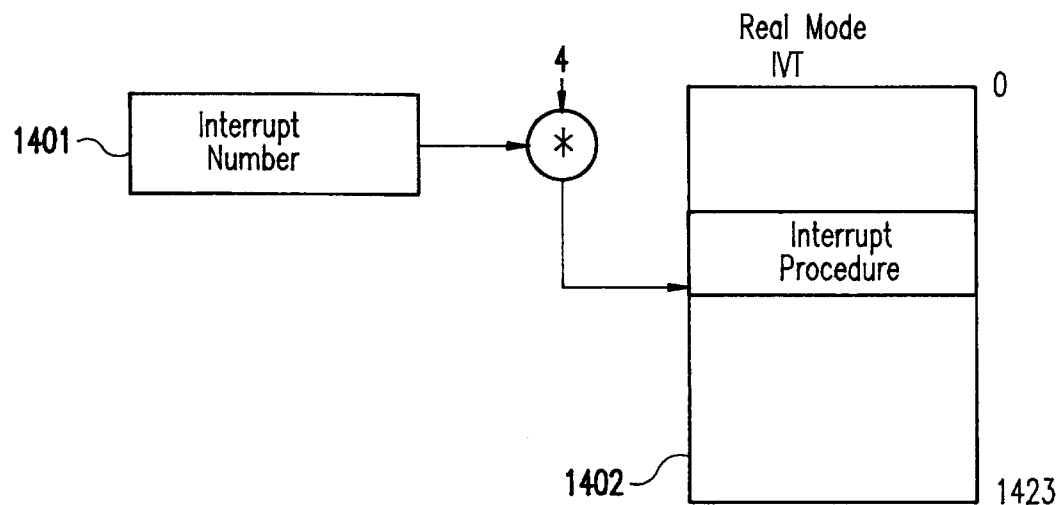
FIG. 15 is a block diagram showing the X86 real mode and protected mode interrupt vector tables.
Figure 15:
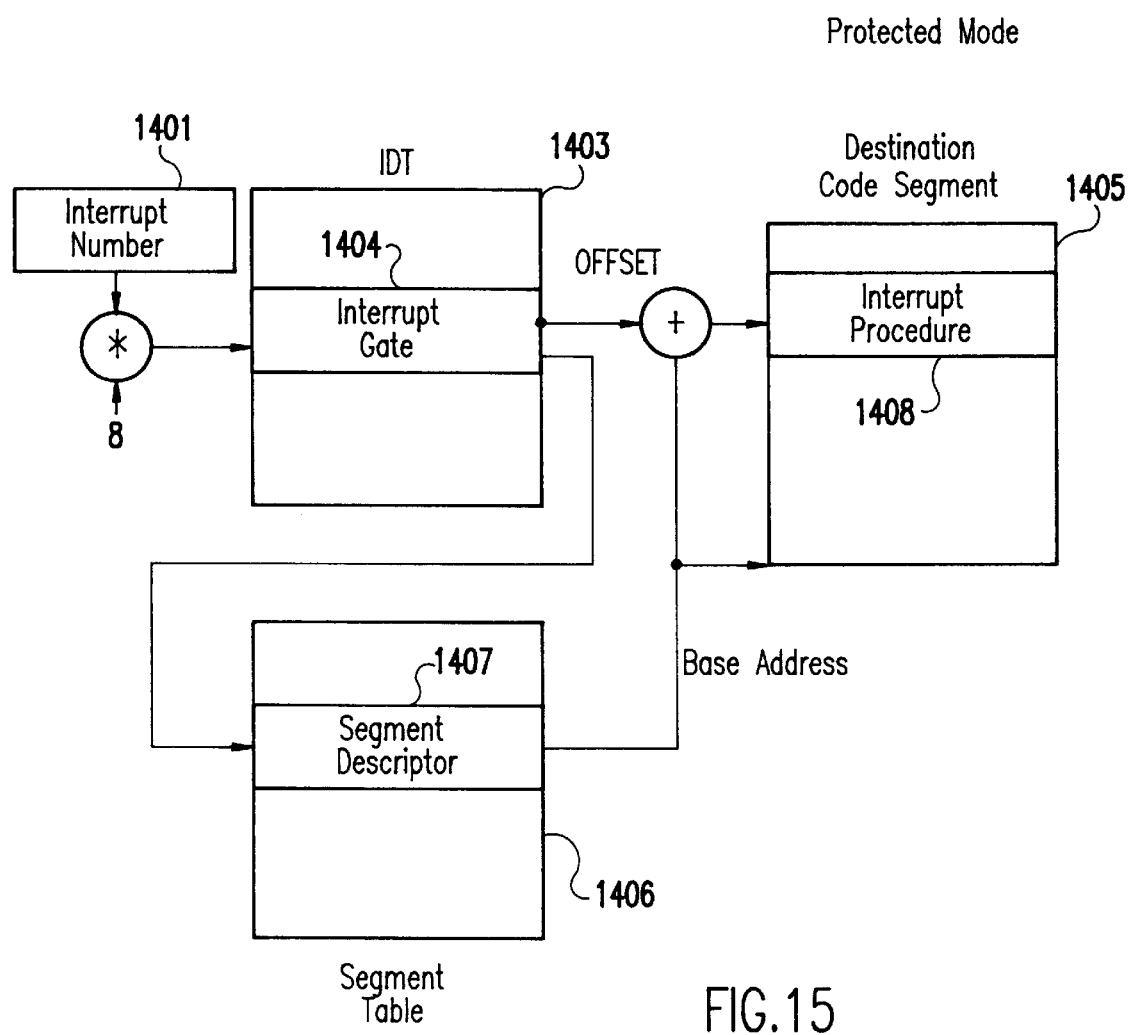

FIG. 15 shows the two methods in which interrupt procedure locations may be specified by the X86 architecture. In both methods the interrupt number 1401 is specified by either an instruction, an external interrupt or an internal exception. In X86 real mode (protected mode disabled), the interrupt vector table 1402 usually has a base address of 0x00000000. An interrupt procedure is located by multiplying the interrupt number 1401 by four, thus providing a "far" pointer to the interrupt processor. The "far" pointer is comprised of an offset and a segment value. In X86 protected mode (address translation enabled), the interrupt number 1401 is multiplied by 8 to yield an offset into an interrupt descriptor table 1403. The interrupt gate 1404 referenced by the scaled interrupt number 1401 contains an offset into a destination code segment 1405, and an offset into a segment table 1406. The segment descriptor 1407 in pointed to by the offset into segment table 1406 contains the base address of the destination code segment 1405. This base address is added to the offset into the destination code segment 1405 to form the effective address of the interrupt procedure 1408.

Figure 16:
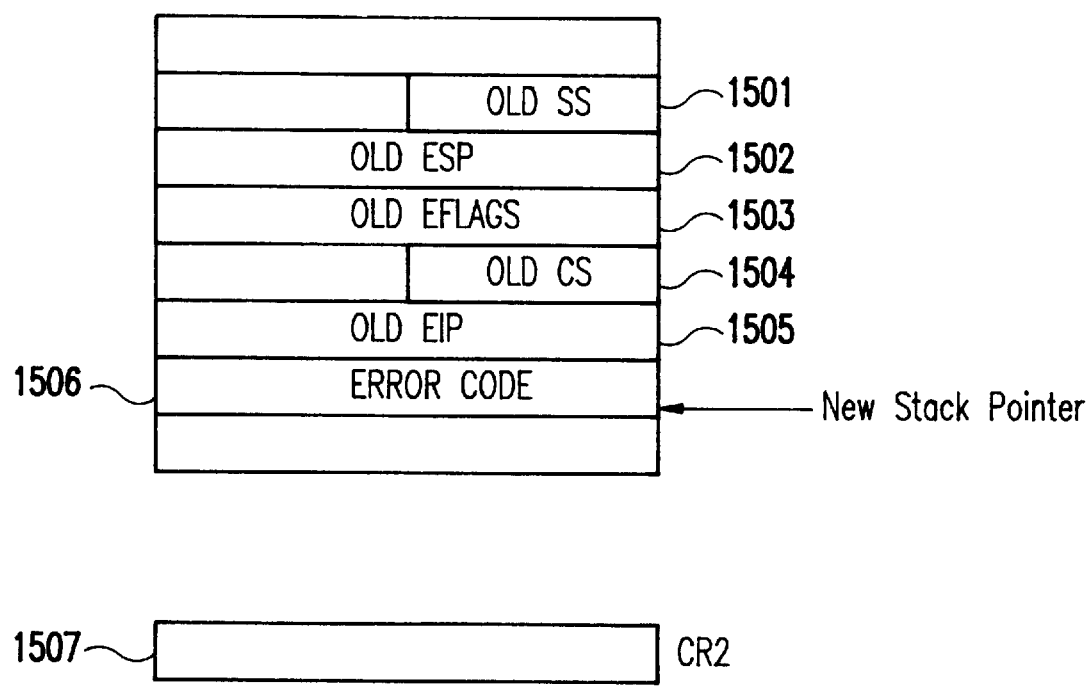
FIG. 16 is a block diagram showing the X86 interrupt status and control registers and interrupt stack.

When an interrupt is taken in the X86 architecture, certain information is recorded on the interrupt procedure stack as shown in FIG. 16. This consists of the stack pointer of the interrupted procedure (the old SS 1501 and old ESP 1502), a pointer to the instruction that was interrupted (the old CS 1504 and old EIP 1505), an error code 1506, and a copy of the EFLAGS 1503 which contains the state of the interrupted instruction. In addition, page fault interrupts will store the address of the instruction or data byte that caused the page fault in CR2 1507.

Interrupts and exceptions for both the PowerPC and X86 architectures are handled by the branch processing unit (BPU) 1054 in FIG. 1. The architecture context mechanism bit from the architecture mode control unit 108 determines which of the two interrupt and exception mechanisms, PowerPC or X86, will be used by the microprocessor.

When the architecture qualification mechanism bit is enabled, interrupts and exceptions encountered by the processor are handled by either the PowerPC or X86 architected mechanism, depending on the type of interrupt or exception as well as the state of the architecture context mechanism bit. Specifically, all asynchronous interrupts are directed to the PowerPC interrupt mechanism regardless of the state of the architecture context mechanism bit. This is done to allow an operating system to have a consistent point of control over events that may have no connection to what the processor was executing when they occurred.

Synchronous exceptions are, in general, directed to the architected mechanism as defined by the architecture context mechanism bit. This is not true, however, in the cases of (a) any form of exception resulting from page translation and (b) any form of exception resulting from PowerPC protection checking taking place within the MMU. In both cases the exception is directed to the PowerPC mechanism regardless of the value of the architecture context mechanism bit. This is done because X86 paging is not activated, so all PowerPC MMU-related exceptions must be forwarded to the PowerPC mechanism.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A processor which supports first and second architectures having separate and distinct modes of operation and separate and distinct instruction sets and memory management schemes, said processor running under a single multitasking operating system and comprising:

an instruction decoder directly receiving instructions from memory and decoding said received instructions as being in a first instruction set of said first architecture or being in a second instruction set of said second architecture depending on an architectural context for each said received instruction;

a memory management unit determining and indicating to which of said first and second architectures each of said directly received instructions belongs and said memory management unit performing address translation from virtual to real addresses for said first and second architectures; and control means for detecting and indicating said architectural context of a program responsive to a processor state, an initial state change indication, said memory management unit indication and said control means indication combining to indicate said processor state, said program being read from memory as being either code for said first architecture or code for said second architecture, said control unit controlling said instruction decoder and said memory management unit to dynamically switch between address translation for a mode of operation corresponding to the first or second architectures and executing one or more decoded instructions according to said mode of operation.

2. The processor recited in claim 1 wherein the memory management unit comprises a mode control mechanism controlled by said control means for controlling which of first or second architectural translation methods is to be used by a memory management unit when translating an effective address to a virtual address.

3. The processor recited in claim 2 wherein the mode control mechanism controls an instruction fetch and decode mechanism of the processor so that instructions of said first and second architectures are fetched and aligned for proper decoding by said instruction decoder.

4. The processor recited in claim 3 wherein said memory management unit reads a page mode control bit from a page table entry for said second architecture, said page mode control bit being supplied to said control means to control address translation by said memory management unit.

5. A processor which supports first and second architectures with separate and distinct instruction sets and memory management schemes, said processor running under a single multitasking operating system and comprising:

a memory management unit determining and indicating whether each instruction in memory is of said first or second architecture, said memory management unit further performing address translation from virtual to real addresses for said first and second architectures;

an instruction decoder directly receiving instructions from memory and decoding said received instructions as belonging to the instruction set of said first or said second architecture depending on an architectural context for each said received instruction; and control means for detecting and indicating said architectural context of a program being read from memory responsive to a processor state, an initial state change indication, said memory management unit indication and said control means indication combining to indicate said processor state and controlling said instruction decoder and said memory management unit to dynamically switch between address translation for said first or said second architectures and executing one or more decoded instructions according to said architectural context, wherein said control means comprises:

an architectural context control mechanism for controlling which architectural context the processor operates under, said architectural context control mechanism controlling an architectural translation method to be used by the memory management unit of the processor when translating an effective address to a virtual address, said architectural context control mechanism further controlling instruction fetch and decode logic of the processor, said architectural context control mechanism further controlling an execution context of process and resources, and said architectural context control mechanism further controlling an interrupt and exception mechanism of the processor, and a qualifying mode control mechanism for enabling extensions and limitations to the two architectures, said extensions and limitations allowing a single address translation mechanism to map addresses for one architecture onto translation of addresses of another architecture and a unified interrupt and exception mechanism handling asynchronous interrupts and page translation and protection related exceptions regardless of the architectural context in effect when an interrupt or exception occurs.

6. A processor which supports first and second architectures having separate and distinct instruction sets and memory management schemes, said processor running under a single multitasking operating system and comprising:

an instruction decoder directly receiving instructions from memory and decoding said received instructions as being in a first instruction set of said first architecture or being in a second instruction set of said second architecture depending on an architectural context for each said received instruction, wherein said instruction decoder comprises:

first decoding means for decoding instructions for said first instruction set, second decoding means for decoding instructions for said second instruction set, and selection means for selecting decoded instructions from said first decoding means or decoded instructions from said second decoding means;

a memory management unit determining and indicating to which of said first and second architectures each of said directly received instructions belongs and said memory management unit performing address translation from virtual to real addresses for said first and second architectures; and control means for detecting and indicating said architectural context of a program being read from memory responsive to a processor state, an initial state change indication, said memory management unit indication and said control means indication combining to indicate said processor state, said control means controlling the selection means of said instruction decoder and controlling said memory management unit to dynamically switch between address translation for the first or second architectures and executing one or more decoded instructions according to said architectural context.

7. The processor recited in claim 6 wherein said first and second decoding means decode simple instructions of said first and second architectures, simple instructions being instructions that map into a basic operation class and can be handled by a single execution unit, said instruction management means further comprising:

third decoding means for decoding complex instructions of said first instruction set;

fourth decoding means for decoding complex instructions of said second instruction set;

second selection means controlled by said control means for selecting decoded instructions from said third or fourth decoding means;

second mapping means receiving an output of said second selection means for mapping decoded instructions from said third or fourth decoding means for mapping said decoded instructions to multiple, simple instructions of said second instruction set; and third selection means responsive to a valid signal from one of said third or fourth decoding means for selecting an output of said second mapping means when a complex instruction is decoded or an output of the first mentioned selection means when a simple instruction is decoded.

8. A processor which supports first and second architectures having separate and distinct instruction sets and memory management schemes, said processor running under a single multitasking operating system and comprising:

an instruction decoder directly receiving instructions from memory and decoding said received instructions as being in a first instruction set of said first architecture and a second instruction set of said second architecture depending on an architectural context for each said received instruction;

a memory management unit determining and providing a page bit indicating to which of said first and second architectures each of said directly received instructions belongs and said memory management unit performing address translation from virtual to real addresses for said first and second architectures; and control means for detecting and providing an architecture qualifying bit indicating said architectural context of a program being read from memory responsive to a processor state, said control means and controlling said instruction decoder and said memory management unit to dynamically switch between address translation for the first or second architectures and executing one or more decoded instructions according to said architectural context, wherein said control means comprises a mode control unit which controls the processor state depending on a state of a plurality of bits stored in registers within said processor including an initial stage change bit which determines whether address translation for said second architecture is enabled or disabled, said page bit which indicates whether a current page in memory is for said first or second architectures, and said architecture qualifying bit.

9. The processor recited in claim 8 wherein the processor includes a memory management unit which detects a page mode of instructions read from main memory and informs said mode control unit whether a current page in memory is for said first or second architectures by said second bit.

10. The processor recited in claim 8 wherein the mode control unit further includes a feature control register and is responsive to a power on or reset condition of the processor to initialize said processor in one of first or second modes corresponding to said first or second architectures, respectively, a state of a bit in said feature control register thereafter enabling dynamic switching between architectural contexts.

11. A method implemented in a processor for supporting two separate and distinct instruction-set architectures corresponding to two separate and distinct modes of operation, said processor including an instruction fetch and decode mechanism directly receiving instructions from memory and decoding said received instructions as being in a first instruction set of a first architecture or being in a second instruction set of a second architecture depending on an architectural context for each said received instruction, said processor operating under a single multitasking operating system, said method comprising the steps of:

determining an operating state from an initial state change indicator, a current page indicator and an architecture qualifying indicator;

controlling which of first or second architectural translation methods is to be used by a memory management unit when translating an effective address to a virtual address in response to said operating state;

controlling the instruction fetch and decode mechanism so that instructions of the two different architectures are decoded properly in response to said operating state;

translating addresses of the two different architectures by mapping the translation of one architecture onto that of another architecture; and switching from application software written for one architecture to application software written for another architecture in a multitasking environment.

12. The method implemented in a processor recited in claim 11 further comprising the steps of:

controlling an interrupt and exception mechanism of the microprocessor;

enabling extensions and limitations to the two architectures, said extensions and limitations allowing a single address translation mechanism to translate addresses for a first architecture by mapping onto a translation of a second architecture and a unified interrupt and exception mechanism to handle asynchronous interrupts and page translation and protection related exceptions regardless of an architectural context in effect when an interrupt or exception occurred; and determining an architectural context under which instructions should execute.

13. A computer system comprising:

a microprocessor, said microprocessor supporting two separate and distinct modes of operation corresponding to two separate and distinct instruction-set architectures and running under a single multitasking operating system;

an external memory device, said external memory device storing application software for said two architectures; and a system bus connecting said microprocessor to said external memory device;

said microprocessor having an internal bus connected to said system bus, said microprocessor including:

an instruction decoder directly receiving instructions from memory and decoding said received instructions as being in a first instruction set of said first architecture or being in a second instruction set of said second architecture depending on an architectural context for each said received instruction;

a memory management unit determining and providing an indication of which of said first and second architectures each of said directly received instructions belongs and said memory management unit performing address translation from virtual to real addresses for said first and second architectures; and control means for detecting and indicating said architectural context of a program being read from memory as being either code for said first architecture or code for said second architecture responsive to a processor state, an initial state change indication, said memory management unit indication and said control means indication combining to indicate said processor state, said control means and controlling said instruction decoder and said memory management unit to dynamically switch between said mode of operation corresponding to the first or second architecture and executing one or more decoded instructions according to said architectural context.

14. The computer system recited in claim 13 wherein the memory management unit of said microprocessor comprises a mode control mechanism for controlling which of first or second architectural translation methods is to be used by a memory management unit when translating an effective address to a virtual address.

15. The computer system recited in claim 14 wherein the mode control mechanism controls an instruction fetch and decode mechanism of the processor so that instructions of said first and second architectures fetched and aligned for proper decoding by said instruction decoder.

16. The computer system recited in claim 15 wherein said memory management unit reads a page mode control bit from a page table entry for said second architecture, said page mode control bit being supplied to said control means to control address translation by said memory management unit.

17. The computer system recited in claim 13 wherein said control means comprises:

an architectural context control mechanism for controlling which architectural context the processor operates under, said architectural context control mechanism controlling an architectural translation method to be used by a memory management unit of the microprocessor when translating an effective address to a virtual address, said architectural context control mechanism further controlling instruction fetch and decode logic of the microprocessor, said architectural context control mechanism further controlling an execution context of process and architected resources, and said architectural context control mechanism further controlling an interrupt and exception mechanism of the microprocessor; and a qualifying mode control mechanism for enabling extensions and limitations to the two architectures, said extensions and limitations allowing a single address translation mechanism to map addresses for one architecture to address translations of another architecture and a unified interrupt and exception mechanism that handles asynchronous interrupts and page translation and protection related exceptions regardless of an architectural context in effect when an interrupt or exception occurs.

18. The computer system recited in claim 13 wherein said instruction set management means of said microprocessor comprises:

first decoding means for decoding instructions for said first instruction set;

second decoding means for decoding instructions for said second instruction set; and selection means controlled by said control means for selecting decoded instructions from said first decoding means or decoded instructions from said second decoding means.

19. The computer system recited in claim 18 wherein said first and second decoding means decode simple instructions of said first and second architectures, simple instructions being instructions that map into a basic operation class and can be handled by a single execution unit, said instruction management means further comprising:

third decoding means for decoding complex instructions of said first instruction set;

fourth decoding means for decoding complex instructions of said second instruction set;

second selection means controlled by said control means for selecting decoded instructions from said third or fourth decoding means; and third selection means responsive to a valid signal from one of said third or fourth decoding means for selecting an output of said third or fourth decoding means when a complex instruction is decoded or an output of the first mentioned selection means when a simple instruction is decoded.

20. The computer system recited in claim 13 wherein said control means of said microprocessor comprises a mode control unit which controls the processor to be in one of a plurality of states depending on a state of a plurality of bits stored in registers within said processor including a first bit which determines whether address translation for said second architecture is enabled or disabled, a second bit which indicates whether a current page in memory is for said first or second architectures, and a third bit which is an architecture qualifying bit.

21. The computer system recited in claim 20 wherein the processor includes a memory management unit which detects a page mode of instructions read from main memory and informs said mode control unit whether a current page in memory is for said first or second architectures by said second bit.

22. The computer system recited in claim 20 wherein the mode control unit further includes a feature control register and is responsive to a power on or reset condition of the processor to initialize said processor in one of first or second modes corresponding to said first and second architectures, respectively, a state of a bit in said feature control register thereafter enabling dynamic switching between architectural contexts.

23. The computer system recited in claim 13 wherein the microprocessor has a single memory management unit which is implemented using a format common to the two supported architectures.

24. The computer system recited in claim 13 wherein the microprocessor has a single instruction fetch mechanism shared by the two supported architectures and separate instruction decode mechanisms.

25. The computer system recited in claim 13 wherein all execution resources of the microprocessor are common to the two supported architectures.

26. A processor which supports first and second architectures having separate and distinct instruction sets and memory management schemes corresponding to two separate and distinct modes of operation, said processor comprising:

a system interface for connecting to an external memory storing application programs written for said first and second architectures;

a memory management unit connected to said system interface, said memory management unit reading a page mode control bit from a page table entry for said second architecture;

an instruction unit including a fetch and decode mechanism, said fetch and decode mechanism including first decoding means for decoding instructions for a first instruction set and mapping decoded instructions to one or more decoded instructions for a second instruction set, second decoding means for decoding instructions for a second instruction set, and selection means for selecting decoded instructions decoded by said first or second decoding means;

an execution unit connected to receive and execute decoded instructions from said instruction unit, said execution unit having a plurality of registers accessible depending on which of said first or second modes of operation are enabled; and a mode control unit providing an architecture qualifying bit connected to control said instruction unit and said execution unit, said page mode control bit, an initial change bit and said architecture qualifying bit being supplied to said mode control unit and enabling one of said first or second modes of operation to control address translation and controlling said instruction fetch and decode mechanism of the processor so that instructions of said first and second architectures fetched and aligned for proper decoding.

27. The processor recited in claim 26 wherein said mode control unit controls the processor to be in one of a plurality of states depending on a state of a plurality of bits stored in registers within said processor including a first bit which determines whether address translation for said second architecture is enabled or disabled, a second bit which indicates whether a current page in memory is for said first or second architectures, and a third bit which is an architecture qualifying bit.

28. The processor recited in claim 27 wherein the mode control unit further includes a feature control register and is responsive to a power on or reset condition of the processor to initialize said processor in one of said first or second modes of operation corresponding to said first and second architectures, respectively, a state of a bit in said feature control register thereafter enabling dynamic switching between architectural contexts.

* * * * *